(12) United States Patent
Shetter et al.

(10) Patent No.: US 6,342,896 B1
(45) Date of Patent: Jan. 29, 2002

(54) METHODS AND APPARATUS FOR EFFICIENTLY IMPLEMENTING AND MODIFYING FOREGROUND AND BACKGROUND COLOR SELECTIONS

(75) Inventors: Martin T. Shetter, Bellevue; Gregory C. Hitchcock, Woodinville; Bodin Dresevic, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/272,412

(22) Filed: Mar. 19, 1999

(51) Int. Cl.$^7$ .............................................. G06F 17/30

(52) U.S. Cl. ...................... 345/589; 345/549; 345/591; 345/601

(58) Field of Search ................................ 345/147, 150, 345/153, 155, 199, 149, 152, 186, 192, 194, 196, 517, 589, 591, 593, 596, 597, 600, 601, 549, 605, 613, 551, 552, 83, 88–89; 707/528; G06F 17/30

(56) References Cited

U.S. PATENT DOCUMENTS

| | | | | |
|---|---|---|---|---|
| 5,057,739 | A | 10/1991 | Shimada et al. | 313/477 R |
| 5,122,783 | A | 6/1992 | Bassetti, Jr. | 340/701 |
| 5,153,577 | A | * 10/1992 | Mackey | 340/793 |
| 5,298,915 | A | 3/1994 | Bassetti, Jr. et al. | 345/149 |
| 5,334,996 | A | 8/1994 | Tanigaki et al. | 345/152 |
| 5,341,153 | A | * 8/1994 | Benzschawel | 345/152 |
| 5,349,451 | A | * 9/1994 | Dethardt | 358/518 |
| 5,467,102 | A | 11/1995 | Kuno et al. | 345/1 |
| 5,543,819 | A | 8/1996 | Farwell et al. | 345/150 |
| 5,548,305 | A | * 8/1996 | Rupel | 345/150 |
| 5,555,360 | A | 9/1996 | Kumazaki et al. | 395/143 |

(List continued on next page.)

FOREIGN PATENT DOCUMENTS

| | | | | |
|---|---|---|---|---|
| WO | 00/57364 | * | 3/2000 | G06T/11/40 |
| WO | 00/60479 | * | 12/2000 | G06F/15/00 |

OTHER PUBLICATIONS

"How Does Hinting Help?" http://www.microsoft.com/typography/hinting/how.htm/fname=%20&fsize, Jun. 30, 1997.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize Jun. 30, 1997.

"TrueType fundamentals" http://www.microsoft.com/OTSPEC/TTCHO1.htm?fname=%20&fsize=Nov. 16, 1997.

"True Type Hinting" http://www.microsoft.com/typography/hinting/hinting.htm Jun. 30, 1997.

Primary Examiner—Matthew Luu
Assistant Examiner—Wesner Sajous
(74) Attorney, Agent, or Firm—Workman, Nydegger & Seeley

(57) ABSTRACT

Methods and apparatus for utilizing pixel sub-components which form a pixel element of an LCD display as separate Red (R), Green (G), and Blue (B) luminous intensity values. R, G, and B luminous intensity level values are generated as part of a weighted scan conversion operation and are packed into 8 bit values thereby avoiding the need to store, transmit and process separate R, G and B luminous intensity values representing character glyphs. A look-up table including packed pixel values and processed pixel values is used to convert between glyphs represented by the packed pixel values and R, G, and B pixel sub-component values in a format used by the display. In various embodiments the processed pixel values represent the result of performing unpacking, gamma correction, color filtering and color palette selection operations using the packed pixel values as input.

25 Claims, 18 Drawing Sheets

U.S. PATENT DOCUMENTS

| | | | | |
|---|---|---|---|---|
| 5,633,654 A | * | 5/1997 | Keneddy, Jr. | 345/114 |
| 5,670,986 A | | 9/1997 | Leak | 345/154 |
| 5,689,283 A | * | 11/1997 | Shirochi | 345/132 |
| 5,710,577 A | | 1/1998 | Laumeyer | 345/189 |
| 5,767,837 A | | 6/1998 | Hara | 345/152 |
| 5,821,913 A | * | 10/1998 | Mamiya | 345/88 |
| 5,847,698 A | | 12/1998 | Reavey et al. | 345/173 |
| 5,867,169 A | * | 2/1999 | Prater | 345/150 |
| 5,894,300 A | * | 4/1999 | Takizawa | 345/115 |
| 5,933,131 A | * | 8/1999 | Rich | 345/132 |
| 5,949,643 A | | 9/1999 | Batio | 361/681 |
| 5,963,175 A | | 10/1999 | Havel | 345/83 |
| 6,226,017 B1 | * | 5/2001 | Goossen | 345/521 |
| 6,236,390 B1 | * | 5/2001 | Hitchcock | 345/149 |

* cited by examiner

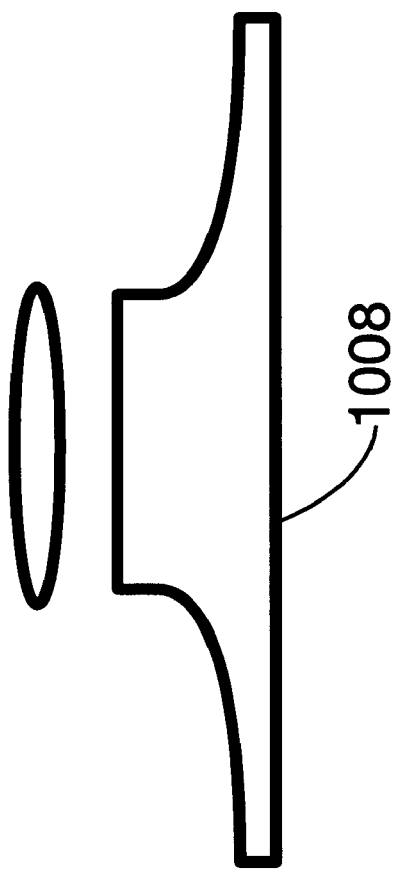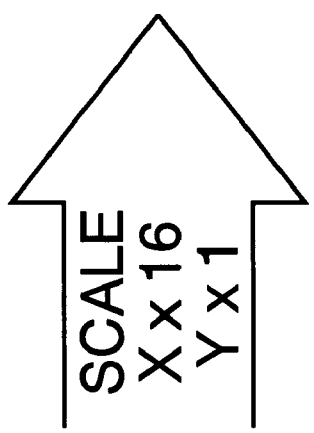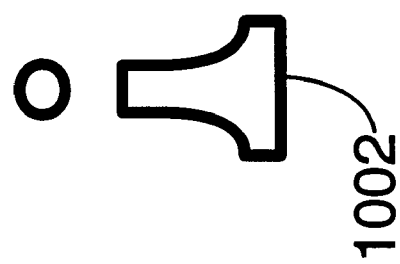
FIG. 11

FIG. 15

| R, G, B LUMINOUS INTENSITY LEVEL VALUES | PACKED PIXEL VALUE |
|---|---|
| 0, 0, 0 | 0 |
| 1, 0, 0 | 1 |
| . . . | . . . |
| (RP-1), (GP-1), (BP-1) | N-1 |

835 → TABLE ENTRIES; 833 → ENTRY POSITION; 832

| TABLE ENTRIES (PROCESSED R, G, B LIMINOUS INTENSITY VALUES) | ENTRY POSITION IN ARRAY OF TABLE ENTRIES |
|---|---|
| $(PR_0)$, $(PG_0)$, $(PB_0)$ | 0 |
| $(PR_1)$, $(PG_1)$, $(PB_1)$ | 1 |
| . . . | . . . |
| $(PR_{N-1})$, $(PG_{N-1})$, $(PB_{N-1})$ | N-1 |

1701, 1702, 1703, 1704, 1705, 1706

| | 835 ↓ | 833 ↓ | 1902 ↓ |
|---|---|---|---|
| | PROCESSED R, G, B LIMINOUS INTENSITY VALUES | PACKED PIXEL VALUE (DARK FOREGROUND/ LIGHT BACKGROUND) | PACKED PIXEL VALUE (LIGHT FOREGROUND/ DARK BACKGROUND) |
| 1701 | $(PR_0), (PG_0), (PB_0)$ | 0 | N-1 |
| 1703 | $(PR_1), (PG_1), (PB_1)$ | 1 | N-2 |
| | . . . | . . . | . . . |
| 1705 | $(PR_{N-1}), (PG_{N-1}), (PB_{N-1})$ | N-1 | 0 |

FIG. 19

METHODS AND APPARATUS FOR EFFICIENTLY IMPLEMENTING AND MODIFYING FOREGROUND AND BACKGROUND COLOR SELECTIONS

FIELD OF THE INVENTION

The present invention relates to methods and apparatus for displaying images, and more particularly, to display methods and apparatus which utilize multiple displaced portions of an output device, e.g., liquid crystal display, to represent a single pixel of an image.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by the human eye.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue. The coating results in repeating sequences of phosphor dots which, when excited by a beam of electrons, will generate the colors red, green and blue.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted corresponding to the additive primary colors, red, green, and blue, can be varied to get the appearance of almost any desired color pixel. Adding no color, i.e., emitting no light, produces a black pixel. Adding 100 percent of all three colors results in a white pixel.

Portable computing devices, including hand held devices and portable computers, tend to use liquid crystal displays (LCD) or other flat panel display devices 102, as opposed to CRT displays. This is because flat panel displays tend to be small and light weight as compared to CRT displays. In addition, flat panel displays tend to consume less power than comparable sized CRT displays making them well suited for battery powered applications.

Color LCD displays are exemplary of display devices which utilize multiple distinctly addressable elements, referred to herein as pixel sub-components or pixel sub-elements, to represent each pixel of an image being displayed. Normally, each pixel element of a color LCD display comprises three non-square elements, i.e., red, green and blue (RGB) pixel sub-components. Thus, a set of RGB pixel sub-components together make up a single pixel element. Known LCD displays generally comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction.

FIG. 1 illustrates a known LCD screen 200 comprising a plurality of rows (R1–R12) and columns (C1–C16). Each row/column intersection forms a square which represents one pixel element. FIG. 2 illustrates the upper left hand portion of the known display 200 in greater detail.

Note in FIG. 2 how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width pixel sub-components 206, 207, 208 form a single pixel element.

As illustrated in FIG. 1, one known arrangement of RGB pixel sub-components form what appear to be vertical color stripes down the display 200. Accordingly, the arrangement of ⅓ width color sub-components 206, 207, 208, in the known manner illustrated in FIGS. 1 and 2, is sometimes called "vertical striping".

Traditionally, each set of pixel sub-components for a pixel element is treated as a single pixel unit. Accordingly, in known systems luminous intensity values for all the pixel sub-components of a pixel element are generated from the same portion of an image. Consider for example, the image represented by the grid 220 illustrated in FIG. 3. In FIG. 3 each square represents an area of an image which is to be represented by a single pixel element, e.g., a red, green and blue pixel sub-component of the corresponding square of the grid 230. In FIG. 3 a shaded circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in known systems, the RGB pixel sub-components are generally used as a group to generate a single colored pixel corresponding to a single sample of the image to be represented.

While individual RGB sub-component intensities can be varied to support a wide range of different colors, frequently, only a limited number of colors are actually supported by the display hardware and/or software. A supported set of colors is referred to commonly as a color palette. Each color in a color palette corresponds to a different combination of R, G, and B pixel sub-component luminance intensity values. While a computer system may support multiple color palettes, normally only one palette may be used to generate the images displayed at any given time.

In the case of text rendering, a user normally selects a foreground and background color to be used. Commonly, a dark foreground and a light background color is selected to produce dark text on a light colored field. Such an approach mimics printed text which frequently tends to be black on a white background.

As an alternative to a dark foreground and a light background, a user may select a light foreground and a dark background. While such a text option is less common, it is sometimes used, e.g., to highlight text on the screen.

In the case where text is rendered at pixel resolution as is commonly done, pixels used to represent a character are set to the selected foreground color, e.g., black, and pixels used to represent the background are set to white. As discussed above, to produce a black pixel the R, G, and B pixel sub-components of the black pixel are set to output the minimum possible luminous intensity. In the case of a white pixel the R, G, and B pixel sub-components are set to their maximum luminous intensity.

Frequently, because of the relatively low display resolution of most video display devices, not enough pixels are available to draw smooth character shapes, especially at common text sizes of 10, 12, and 14 point type.

Portable computing devices, and hand held computing devices in particular, face power consumption problems and, in many cases, cost constraints, which are frequently less of an issue in desk top computing devices.

As discussed above, power constraints often lead to the use of LCD display devices in an attempt to minimize power consumption. Power concerns also often result in the use of a processor, e.g., CPU, designed with power saving features. Since there are more desk top PCs than portable computers, most CPU manufactures give priority to developing fast CPUs for desktop computers, as opposed to CPUs with power saving features for portable computers. For this reason processors in portable computing devices tend to lag behind their desktop counterparts in terms of processing power.

In the case of hand held computing devices, e.g., personal assistant devices, cost tends to be a limiting factor in terms of both processing power and the amount of memory included in the device.

Thus, while portable and hand held computing devices face many of the same image rendering problems encountered in other image rendering environments, such as desk top personal computers, frequently less processing power and memory is available in the portable computer and hand held environments to address the image rendering problems.

In view of the above discussion, it is apparent that there is a need for improved methods of rendering and displaying images including text. It is desirable that at least some new methods and apparatus support the rendering of text in portable computers and hand held computing devices, where processing and memory resources are limited.

SUMMARY OF THE PRESENT INVENTION

The present invention is directed to methods and apparatus for displaying images utilizing multiple distinct portions of an output device, e.g., an LCD display, to represent a single pixel of an image.

In accordance with the present invention, each pixel sub-component of a pixel element is treated as an independent luminance source. This provides for an increase in resolution of up to 3 times in the direction perpendicular to the direction of RGB striping in the case of striped displays.

The rendering of images, e.g., text characters, in accordance with the present invention involves several steps. These include a rasterization step, an optional glyph caching step, and a device, e.g., display, driver processing step. The rasterization step may include scaling, hinting and scan conversion steps. The rasterization step produces a glyph which includes a monochrome bitmap representation of an image, e.g., a character.

The optional caching step of the present invention involves the storage of glyphs produced by the rasterization operation. When a glyph is generated by the rasterization operation, it is placed in the glyph cache for possible future use. If a character corresponding to a previously rasterized and cached glyph is to be output, the glyph may be obtained from the cache thereby avoiding the need to perform the rasterization operation.

In accordance with one embodiment of the present invention, separate R, G, and B luminous intensity level values associated with each pixel element are packed, e.g., compressed, into a single value referred to herein as a packed pixel value. In this manner, the amount of memory required to store a glyph can be significantly reduced. In one exemplary embodiment, a single 8 bit packed pixel value is used to represent the R, G, B pixel sub-component intensity values associated with each pixel element of an image. This represents a significant savings in memory over systems which use 8 bits to represent each of the R, G, B pixel sub-component luminous intensity values throughout the rendering process.

Prior to display, glyphs from the rasterization step or the glyph cache are processed to generate corresponding pixel values in a format that is supported by a display adapter and/or display device to which the pixel values will be supplied. A pixel value is a value that is used to control the luminous intensity of a pixel element. Accordingly, a pixel value may be an R, G, or B luminance intensity value or, in the case of a palletized display system, a number that is used to index into a table, e.g., color palette, that includes the actual R, G, B luminous intensity values used by the display device. In a palletized display embodiment, the display device or display adapter converts color palette values associated with individual pixels into actual R, G, and B luminous intensity values that are then used to control the R, G, and B luminous intensity of pixel sub-components.

The rasterization operation includes a scan conversion operation and, in various embodiments, optional scaling and hinting operations. As part of the scaling operation a high resolution representation of an image, e.g., character to be displayed, is super sampled in at least the dimension perpendicular to the direction of RGB striping. After hinting of the scaled image, a scan conversion operation is performed. In accordance with one feature of the present invention, the scan conversion operation is a weighted scan conversion operation wherein the hinted image is divided into equal sized portions, e.g., segments and different numbers of segments are used for determining the R, G, and B luminous intensity values.

One particular exemplary embodiment, uses super sampling by a factor of 16, resulting in a super sampled image having 16 segments corresponding to each pixel element. In the particular exemplary embodiment, the implemented weighted scan conversion operation uses 5 image segments to determine the red pixel sub-component luminous intensity value, 9 image segments to determine the green luminous intensity value and 2 image segments to determine the blue luminous intensity value.

In the case of a weighted scan conversion operation, the number N of possible R, G, and B luminous intensity value combinations for a pixel element is equal to the number of possible R values, times the number of possible G values times the number of possible B values. In the 5, 9, 2 scaling case, N corresponds to a total of (6×10×3) 180 possible values.

In accordance with the present invention, rather than representing the R, G and B luminous intensity values resulting from scan conversion operation as three separate values, e.g., an 8 bit R value, an 8 bit G value, and an 8 bit B value, the R, G, B luminous intensity values corresponding to a pixel element are specified as a single number, referred to herein as a packed pixel value. The packed pixel value indicates which one of the possible sets of R, G, and B luminous intensity values a pixel element corresponds. In the 5, 9, 2, case, an 8 bit packed pixel value can be used to easily represent the 180 different possible R, G, B luminous intensity values.

The packed pixel values generated in accordance with the present invention allow a character glyph to be represented using far fewer bits than would be necessary if separate R, G, and B luminous intensity values were stored. The reduction in the amount of data used to represent a glyph using the packing technique of the present invention reduces the amount of bandwidth required to transmit a glyph over a bus as compared to systems which do not pack the luminous intensity values. The small size glyph of the present invention also has the advantage of allowing more glyphs to be stored in the same amount of memory than would be possible if packed pixel values were not used to represent the glyph. Both of these advantages can be important particularly in the case of hand held and portable computing devices where memory and bus bandwidth may be relatively limited.

When a glyph is to be displayed, the set of packed pixel values representing the glyph is supplied to the display driver. The display driver is responsible for performing one or more image processing operations to the data representing the image, e.g., character, to be displayed. The display driver converts the packed pixel values used to represent the glyph into pixel values, e.g., separate 8 bit R, G and B luminance intensity values or color palette values, having a format that is used by the display adapter or display device to which the image data is being output. The display driver may also perform gamma correction operations, color compensation operations and/or color palette selection operations which involve the selection of colors from a limited color palette that is in use at any given time.

In some embodiments the processing operations performed by the display driver are implemented as sequential processing operations. However, in other embodiments of the present invention, the processing operations performed by the display driver are combined into a simple look-up table operation.

For this purpose one or more look-up tables are provided as part of the display driver. Each look-up table corresponds to a different set of device driver operations or input values used to transform packed pixel values into pixel values having a format used by the display adapter or display device. For example, one look-up table may be provided for each of a plurality of supported display devices having different gamma values or pixel value format requirements. In addition, separate look-up tables are used for each supported color palette. For example, one look-up table generated using a color palette associated with Internet applications, is used to process packed pixel values when the Internet application color palette is the display device's active palette. A different look-up table is used when the display device and/or display adapter has a different active color palette.

Each look-up table includes one entry for each potential packed pixel value. The entries are arranged in the table so that the Nth entry corresponds to the Nth packed pixel value in a set of potential packed pixel values. In the case of a palletized display system, each table entry is normally a single pixel value, i.e., a color palette value. In non-palletized systems, each entry is normally a set of R, G, and B pixel sub-component luminous intensity values in a format that can be used by a display adapter and/or display device. In the exemplary case of 180 possible packed pixel values, a look-up table would include 180 entries, each entry corresponding to a different one of the 180 packed pixel values. In one embodiment, each table entry is pre-computed by performing the implemented display driver processing operations using the packed pixel value, to which the output pixel value corresponds, as input.

By using the packed pixel values included in a glyph as indices into the display device look-up table of the present invention, a set of output pixel values in a form utilized by the attached display adapter or display device is obtained. Since the look-up table values are pre-computed, i.e., computed prior to use in the display driver, the need to perform gamma correction, color compensation and/or palette selection operations in real time during image rendering is avoided.

Various features of the present invention are directed to the creation of device driver look-up tables that can be used in the above described manner as will be discussed in detail below.

The present invention allows foreground and background colors to be specified for use in rendering images such as text. When pixel value look-up tables are used to implement the display driver, in accordance with the present invention, a look-up table is normally provided to support a pair of colors which may be used in combination as foreground and background colors. In accordance with the present invention, which color is used as the foreground color and which color is used as the background color, is determined by the manner in which the pixel value look-up table is accessed. In one such embodiment foreground and background colors are interchanged by simply reversing the order in which the pixel value look-up table, corresponding to the utilized color pair, is accessed.

Numerous additional features, embodiments, and advantages of the methods and apparatus of the present invention are set forth in the detailed description which follows.

BRIEF DESCRIPTION OF THE DRAWINGS

FIG. 11 illustrates a scaling operation performed in accordance with an exemplary embodiment of the present invention.

FIG. 15 is an exemplary R, G, B luminous intensity level value to packed pixel value conversion table.

FIG. 17 illustrates an exemplary device driver pixel value look-up table.

FIG. 19 illustrates a display driver look-up table implemented in accordance with an exemplary embodiment of the present invention.

DETAILED DESCRIPTION

As discussed above, the present invention is directed to methods and apparatus for displaying images, e.g., text and/or graphics, on display devices which are capable of utilizing multiple distinct sections of an output device, e.g., the R, G, B pixel sub-components of a liquid crystal display, to represent a single pixel of an image.

Various methods of the present invention are directed to using each pixel sub-component as an independent luminous intensity source as opposed to treating the set of RGB pixel sub-components which comprise a pixel as a single luminous intensity unit. This allows for a display device with RGB horizontal or vertical striping to be treated as having an effective resolution in the dimension perpendicular to the striping that is up to 3 times greater than in the dimension of the striping. Various apparatus of the present invention are directed to display devices and control apparatus which take advantage of the ability to individually control the luminous intensity of the sub-pixel components. resolution in the dimension perpendicular to the striping that is up to 3 times greater than in the other dimension. Various apparatus of the present invention are directed to display devices and control apparatus which take advantage of the ability to individually control the luminous intensity sub-pixel components.

Figure 5:
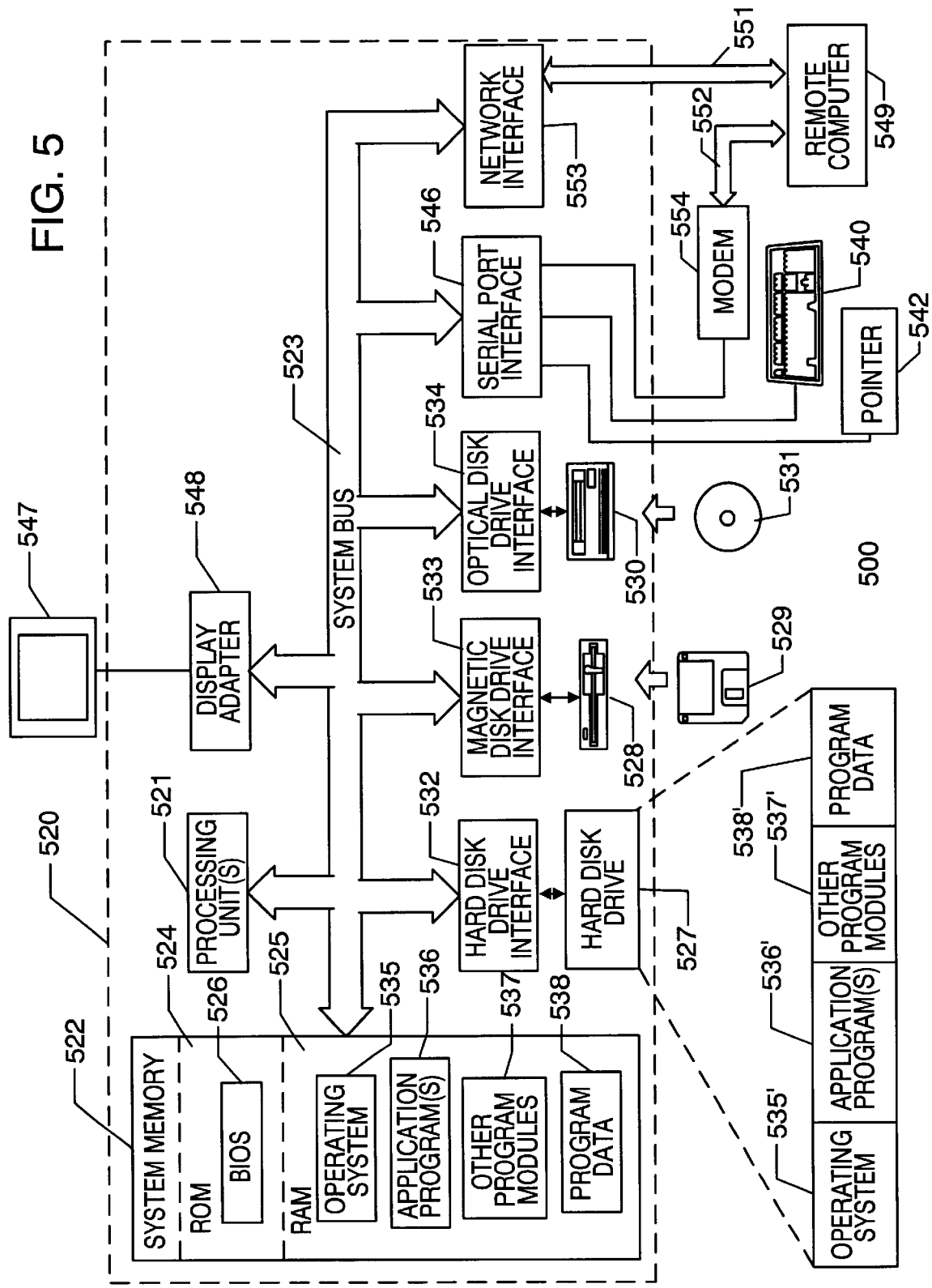
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules, being executed by a computer device such as a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures e.g., look-up tables, etc. that perform task(s) or implement particular abstract data types. Moreover, those skilled in the art will appreciate that at least some aspects of the present invention may be practiced with other configurations, including hand held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device. The personal computer 520 may include a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 527, magnetic disk 529, (magneto) optical disk 531, ROM 524 or RAM 525, such as an operating system 535, one or more application programs 536, other program modules 537, display driver 830, and/or program data 538 for example. The RAM 525 can also be used for storing data used in rendering images for display as will be discussed below. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system bus 523 via an interface, such as a display adapter 548, for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520, although only a memory storage device 550 has been illustrated in FIG. 5. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7:
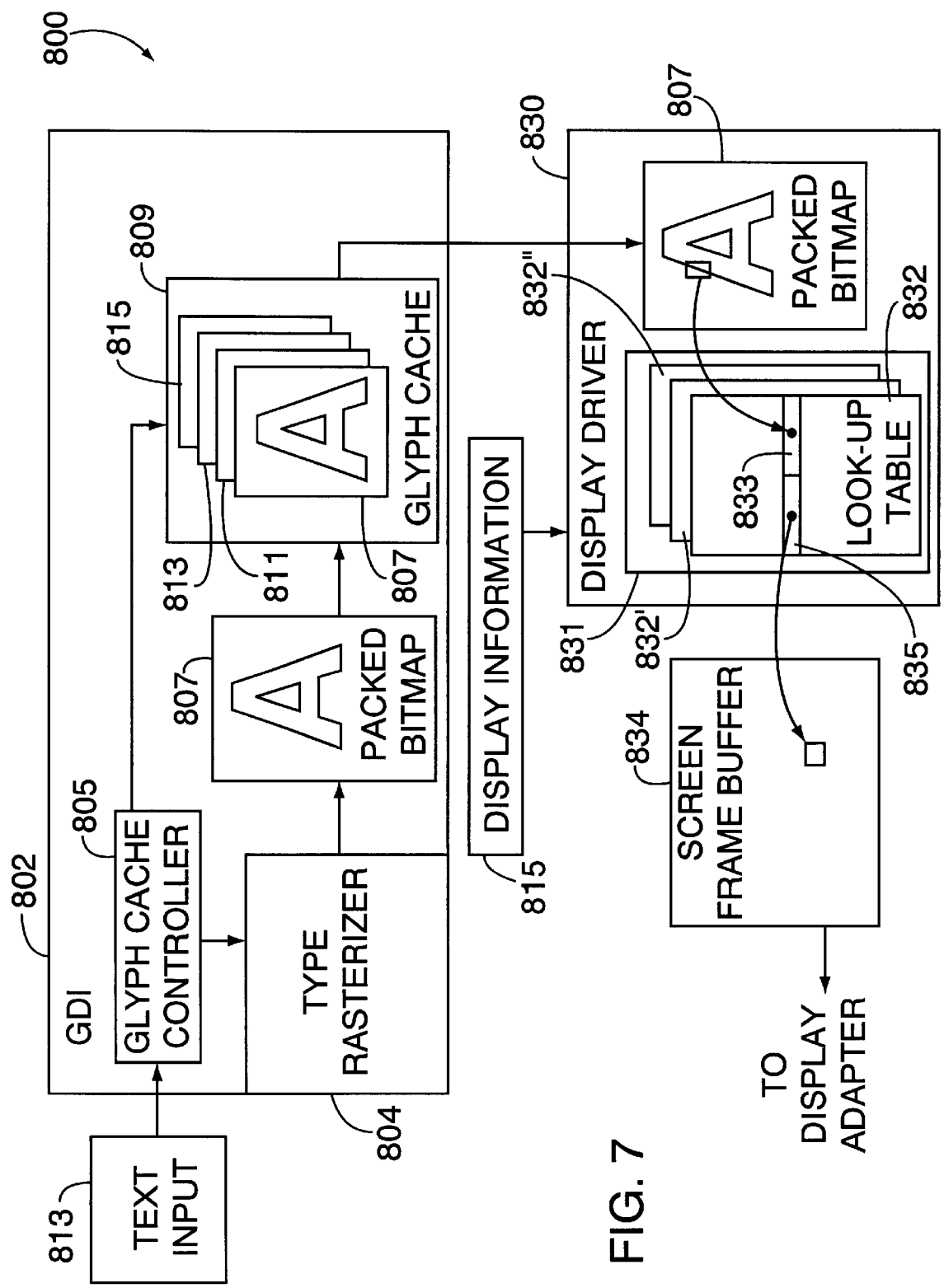
FIG. 7 is a diagram of an image rendering apparatus of the present invention.

FIG. 7 illustrates an image rendering apparatus 800 implemented in accordance with one embodiment of the present invention. The apparatus 800 includes various routines, e.g., included in the memory of the computer system of FIG. 5, used to render text images on the computer system's display 547 in accordance with the present invention.

As illustrated, the image rendering apparatus 800 includes a graphical display interface (GDI) 802, a display driver 830 and a screen buffer 834.

Figure 8:
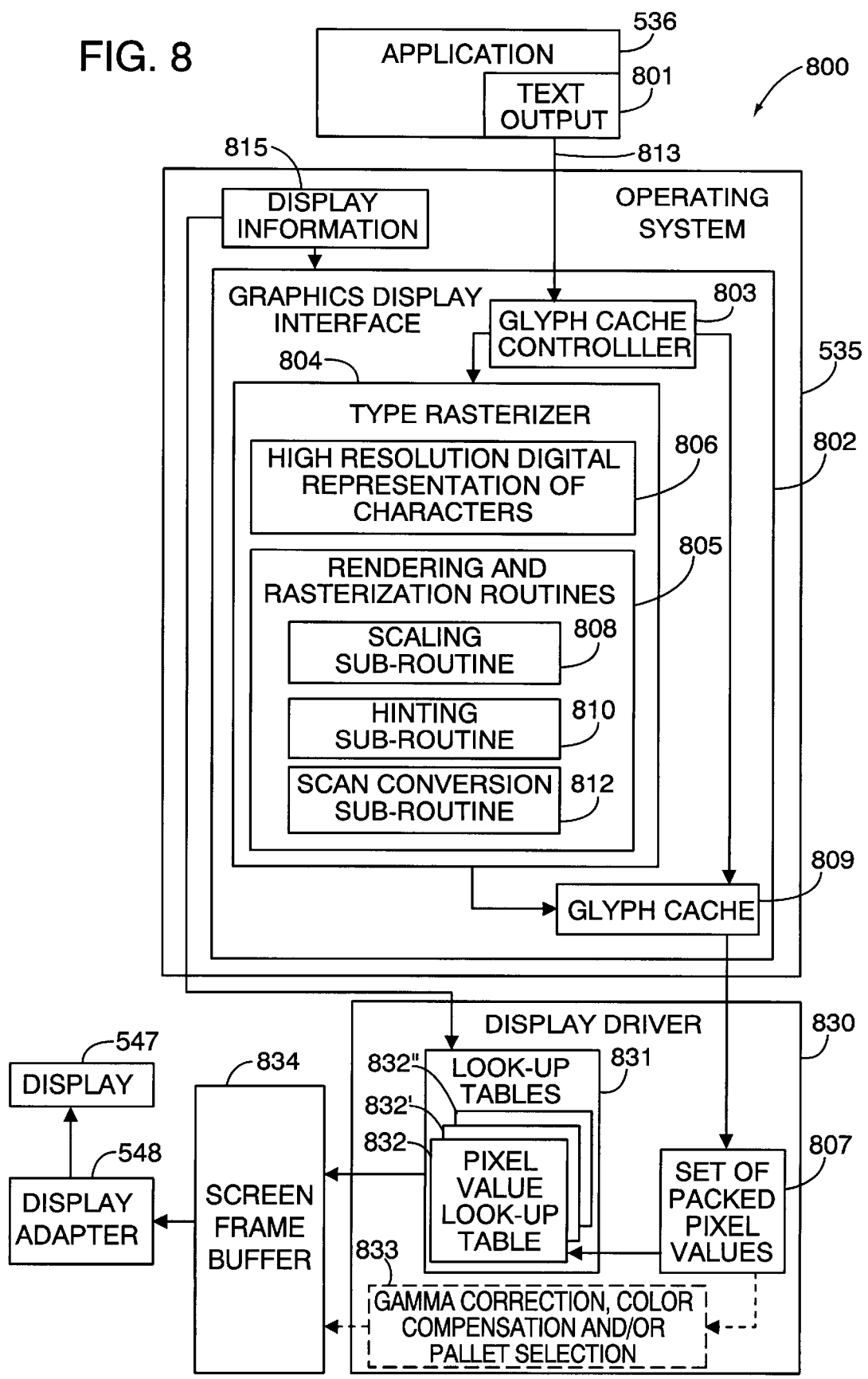
FIG. 8 illustrates the image rendering apparatus of FIG. 7 as it relates to other elements of the computer system illustrated in FIG. 5.

FIG. 8 illustrates the components of image rendering apparatus 800 of the present invention and their relationship to operating system 535 in greater detail. FIG. 8 also illustrates how application 536 may serve as the source of the text input 813 to the GDI 802. In addition, it illustrates how the generated contents of the screen frame buffer 834 can be supplied to the display adapter 548 and ultimately the display device 547. Supplying signals generated by the display adapter 548 from the processed pixel values output by the screen frame buffer 834, results in the rendered text images being displayed on the display device 547.

As illustrated in FIG. 8, the application routine 536, which may be, e.g., a word processor application, includes a text output sub-component 801. The text output sub-component 801 is responsible for outputting text information, represented as arrow 813, to the operating system 535 for rendering on the display device 547.

The operating system 535 includes various components responsible for controlling the display of text on the display device 547. These components include display information 815 and the graphics display interface 802. As discussed above the display information 815 includes, e.g., information on scaling to be applied during rendering. It may also include information used by the display driver 830, such as gamma correction information, foreground/background color information, and/or color palette information.

The graphics display interface 802 includes circuits and/ or routines for processing graphics as well as text. These include the glyph cache controller 803, the glyph cache 809 and type rasterizer 804 which operate as discussed above in regard to FIG. 7.

The glyph cache 809 is used for storing a plurality of glyphs 807, 807', 807", 807'". The stored glyphs, in accordance with the present invention, are bitmap images of, e.g., characters, represented using packed pixel values as will be discussed below. The glyphs may include character spacing information in addition to packed pixel values. The stored glyphs may correspond to different sized representations of the same character, representations of the same character using different fonts, or different characters. The stored glyphs are monochrome character representations with user color foreground/background selections being applied later by the display driver 830.

The GDI 802 receives as its input text information 813. The text information 813 includes, e.g., information identifying the character or characters to be rendered, the font to be used during rendering, and the point size at which the characters are to be rendered. The text information 813 is supplied to the glyph cache controller 803. The glyph cache controller 803 determines if a character to be rendered is already stored in the glyph cache 809. If the character having the specified point size and font type to be rendered is already present in the cache 809, the glyph cache controller 803 controls the glyph cache 809 to output the glyph corresponding to the character to be rendered.

When a character to be rendered is not already present in the glyph cache 809, the type rasterizer 804 is used to generate packed bitmaps, e.g., the glyph 807, in accordance with the present invention. Each glyph generated by the rasterizer 804 is stored in the glyph cache 809 and output for further processing to the display driver 830.

The type rasterizer 804 is responsible for generating a packed bitmap representation, e.g., a glyph, from input information. The type rasterizer 804 includes character data 806 and rendering and rasterization routines 805.

The character data 806 may include, e.g., vector graphics, lines, points and curves, which provide a high resolution digital representation of one or more sets of characters.

Figure 4:
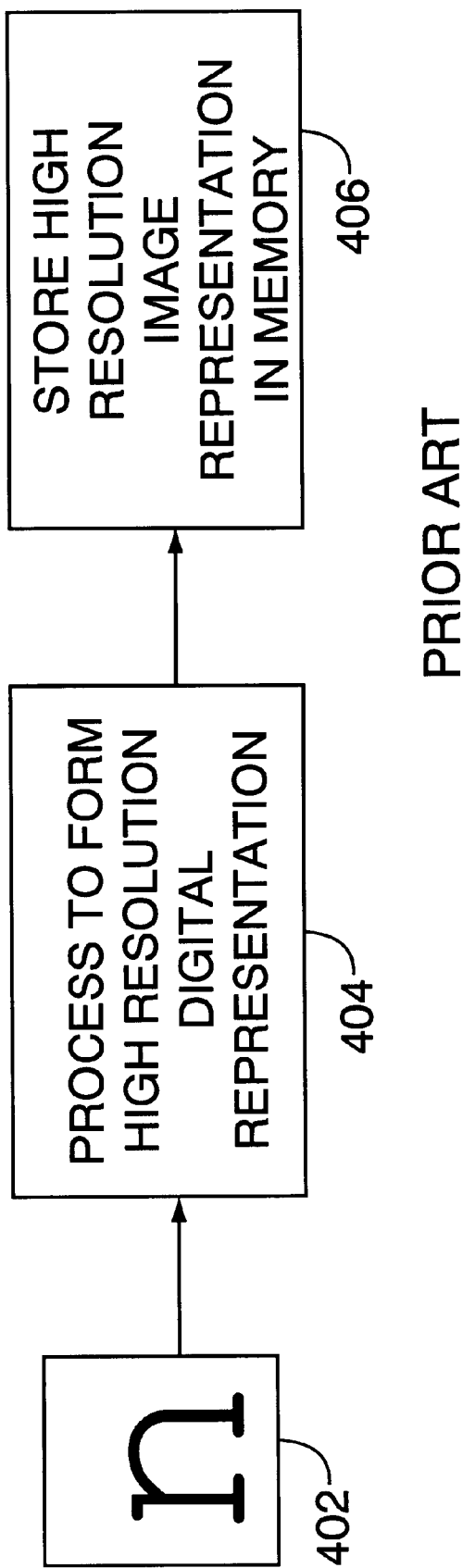
FIG. 4 illustrates known steps involved in preparing and storing character information for use in the subsequent generation and display of text.

As illustrated in FIG. 4, it is known to process text characters 402 to generate high resolution digital representations thereof, such as the data 806, which can be stored in memory for use during text generation. Accordingly, the generation 404 and storage 406 of character data 806, will not be discussed herein in any detail.

The rendering and rasterization routines 805 include a scaling sub-routine 808, a hinting sub-routine 810, and a scan conversion sub-routine 812. The scaling, hinting and scan conversion routines and sub-routines take into consideration, utilize, or treat a screen's RGB pixel sub-components as separate luminous intensity entities which can be used to represent different portions of an image to be rendered. These routines 808, 810 and 812 will be discussed in detail with regard to FIG. 9.

Display driver 830 includes a set of pre-computed look-up tables 831 which, in the FIG. 7 embodiment, are used to perform a plurality of image processing operations.

Display driver 830 receives as its input glyphs, e.g., the glyph 807 output by the GDI 802 and display information 815. The display information 815 includes, e.g., foreground/ background color information, gamma value, color palette information and pixel value format information. The display information 815 is used to select which one of the look-up tables included in the set of tables 831 will be used at any given time.

The look-up tables in the set of tables 83 1 are used for converting packed pixel values used to represent the glyph being processed into processed pixel values. The processed pixel values are of a form which is used by the display adapter 548 and/or display device 547. For example, the processed pixel values may be, e.g., 8 bit R, G, and B luminous intensity values, or luminous intensity values of any utilized number of bits, or palette index values which may comprise any number of bits utilized, e.g., by the display adapter 548 and/or display device 547.

Each look-up table includes one entry for each potential packed pixel value. In an exemplary case of 180 possible packed pixel values, a look-up table would comprise an array of 180 entries arranged so that the Nth array element, representing a look-up table entry, corresponds to the Nth possible packed pixel value. In the case of a palletized display embodiment, each table entry comprises a single color palette value. In other embodiment, each entry includes a set of R, G, B pixel sub-component luminous intensity values. Each output pixel value, i.e., palette value or pixel sub-component luminous intensity value, is a pre-computed value that is generated by performing the implemented display driver processing operations using the packed pixel value, to which the output pixel value(s) correspond, as input.

FIG. 7, illustrates a look-up table 832 which comprises an array of entries 835. One entry 835 is provided for each possible pixel value. Block 833 represents the array position of an element 835 within the table 832. In accordance with the present invention, the array entry corresponding to the array position specified as a packed pixel value is output in response to performing a look-tip operation using a packed pixel value as input. Accordingly, by using the packed pixel value 833 as an index into look-up table 832, the appropriate look-up table entry including one or more pixel values is obtained. The pixel values generated through display driver look-up table operation are stored in the screen frame buffer 834 prior to being output to the display adapter 548. These pixel values are sometimes referred to as processed pixel values since they represent the result of one or more processing operations, e.g., gamma correction, color filtering, and/or palette selection operations.

Use of the screen frame buffer 834 to store pixel values allows a single image of, e.g., a text string, to be generated from glyphs representing several different characters.

By using the packed pixel values included in a glyph as indexes into the look-up table 832, a set of processed pixel values including either color palette values or R, G, and B pixel sub-component luminous intensity values, in the form utilized by the attached display adapter and/or display device, are obtained.

In the FIG. 7 embodiment, the processed pixel values included in the look-up table 832 are pre-computed, i.e., computed prior to use in the display driver 830. By pre-computing the processed pixel values, the need to perform gamma correction, color compensation and/or palette selection operations in real time during image rendering is avoided.

In FIG. 8, the dashed box 833 represents an alternative method to the pixel value look-up table approach which may be used to implement the display driver 830. Block 833 represents gamma correction, color compensation and/or palette selection operations which can be performed using the packed pixel values as input to generate processed pixel values in a format suitable for use by the display adapter 548 and/or display 547.

In various palletized display embodiments, the display adapter 548 converts the color palette values obtained via the display driver look-up table operation into actual R, G, B luminous intensity values through the use of a color palette which is frequently implemented in hardware.

Operations performed by each of the scaling, hinting and scan conversion sub-routines 808, 810, 812, of the present invention will be explained with reference to FIG. 9.

Figure 9:
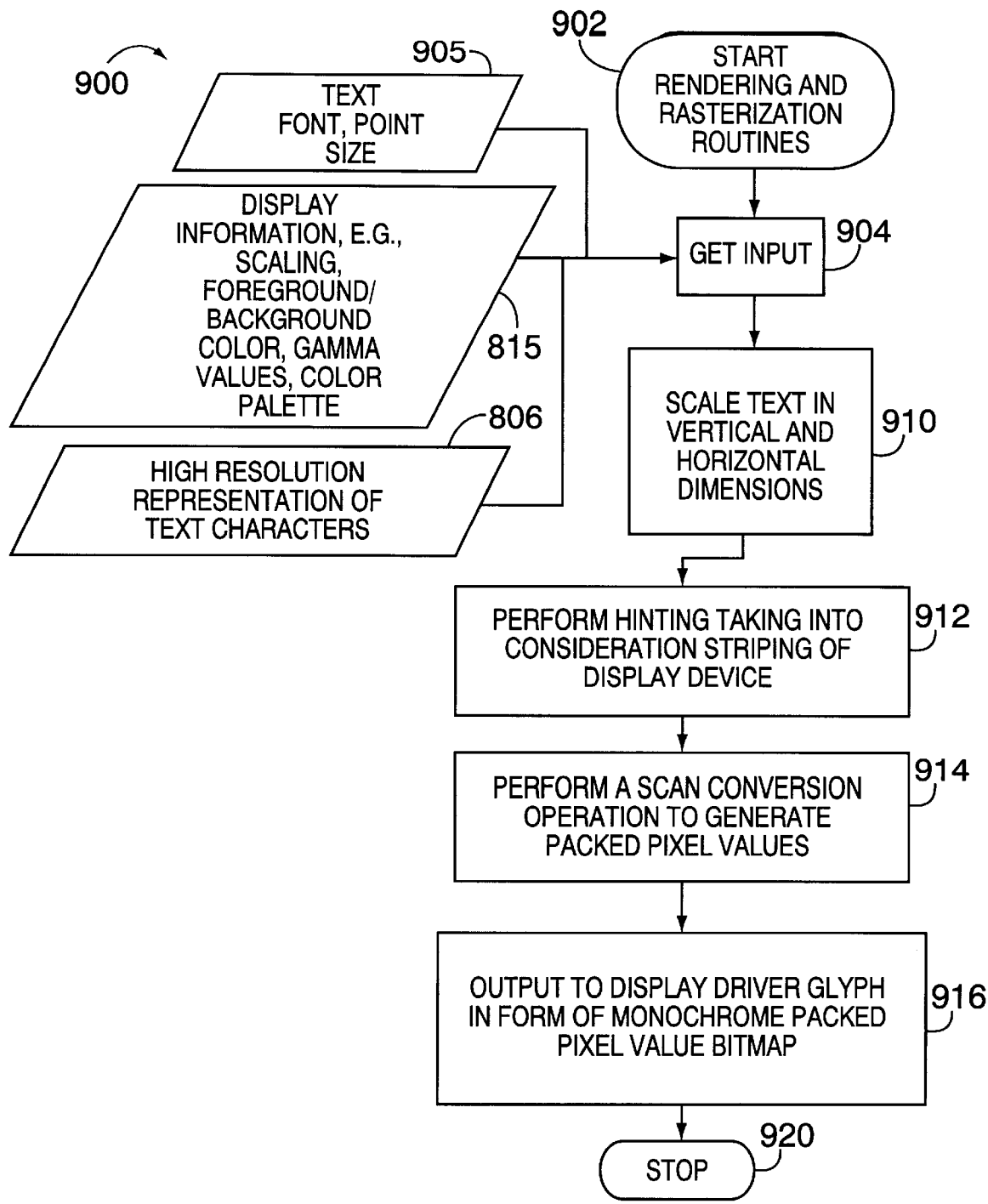
FIG. 9 illustrates a method of rendering text for display in accordance with one embodiment of the present invention.

FIG. 9 illustrates the rendering and rasterization routines 805 used for rendering text for display in accordance with the present invention. As illustrated, the routines 805 begin in step 902 wherein the routines are executed, e.g., under control of the operating system 535, in response to the receipt of text information from the application 536. In step 904 input is received by the text rendering and rasterization routines 805. The input includes text, font, and point size information 905 obtained from the application 536. In addition, the input includes display information 815. Display information 815 includes, e.g., scaling information, foreground/background color information, gamma values, pixel size information, color palette information and/or display adapter/display device pixel value format information. Display information 815 may be obtained from monitor settings stored in memory 522 by the operating system 535.

The input received in step 904 also includes character data 806 which includes a high resolution representation, e.g., in the form of lines, points and/or curves, of the text characters to be displayed.

With the input received in step 904, operation proceeds to step 910 wherein the scaling subroutine 808 is used to perform a scaling operation that involves over sampling. In accordance with one exemplary embodiment of the present invention non-square scaling is performed as a function of the direction and/or number of pixel sub-components included in each pixel element. In particular, the high resolution character data 806, e.g., the line and point representation of characters to be displayed as specified by the received text and font information, is scaled in the direction perpendicular to the striping at a greater rate than in the direction of the striping. This allows for subsequent image processing operations to take advantage of the higher degree of resolution that can be achieved by using individual pixel sub-components as independent luminous intensity sources in accordance with the present invention.

Figure 1:
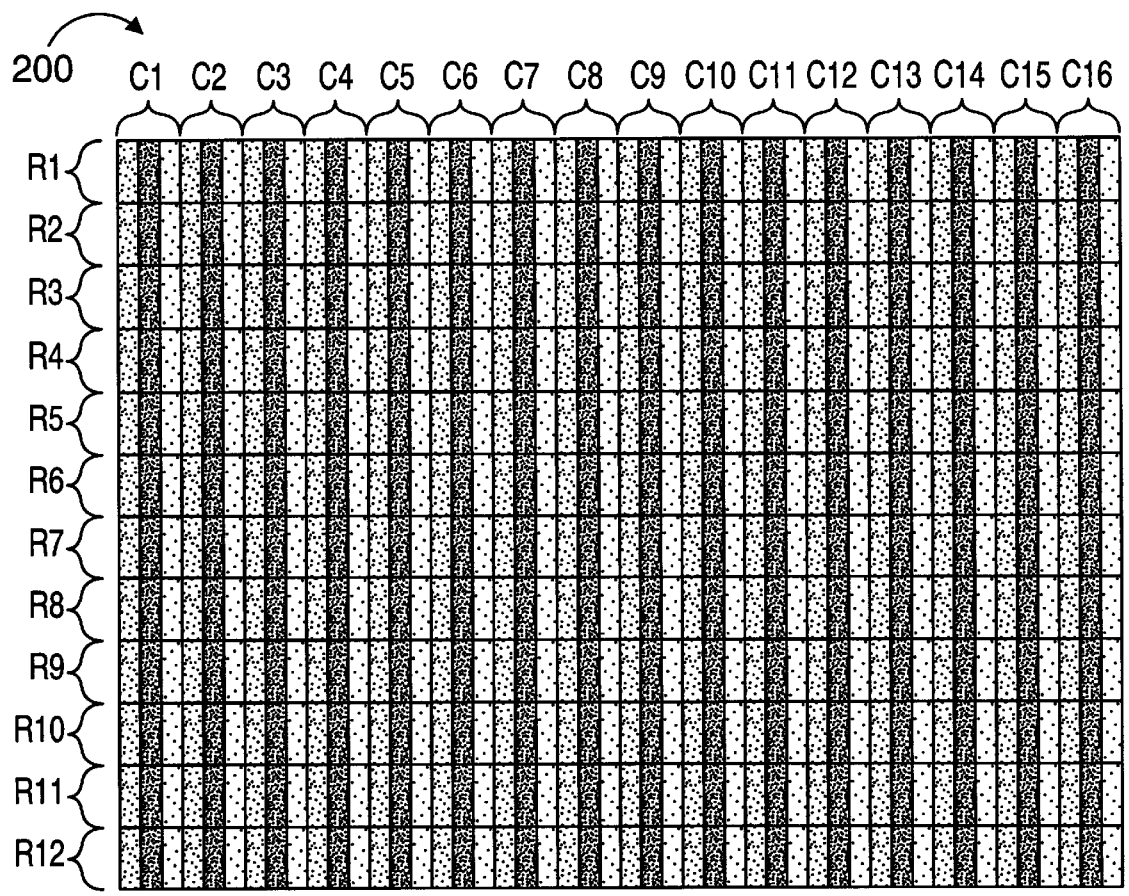
FIG. 1 illustrates a known LCD screen.
Figure 2:
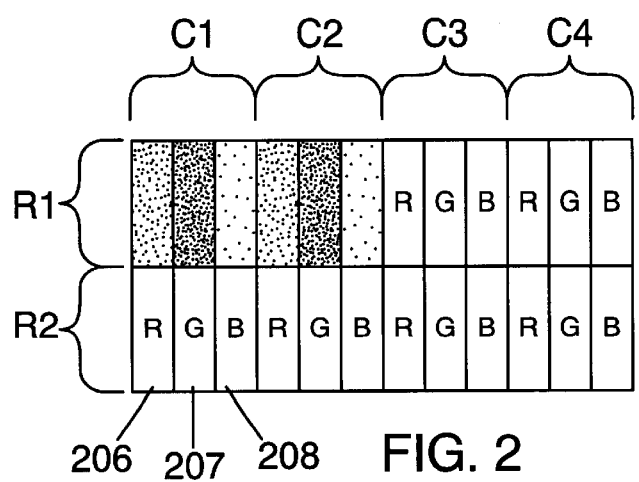
FIG. 2 illustrates a portion of the known screen illustrated in FIG. 1 in greater detail than the FIG. 1 illustration.

Thus, when displays of the type illustrated in FIG. 1 are used as the device upon which data is to be displayed, scaling is performed in the horizontal direction at a rate that is greater than that performed in the vertical direction.

The difference in scaling between the vertical and horizontal image directions can vary depending on the display used and the subsequent scan conversion and hinting processes to be performed. Display information including scaling information obtained in step 904 is used in step 910 to determine the scaling to be performed in a given embodiment.

In most cases, the scaling of characters or images is, but need not be, performed in the direction perpendicular to the striping at a rate which allows further dividing of the red, green and blue stripes to thereby support a subsequent weighted scan conversion operation. In cases where a weighted scan conversion operation is to be applied, scaling is performed as a function of the RGB striping and the weighting used. In one embodiment with vertical striping where the red pixel component is allocated a weight of 5, the green pixel sub-component allocated a weight of 9, and the blue pixel sub-component a weight of 2, scaling is performed at a rate of 1 times in the y direction and 16 times in the x direction.

FIG. 11 illustrates a scaling operation performed on a high resolution representation of the letter i 1002 in anticipation of the display of the letter on a monitor with vertical striping such as the one illustrated in FIG. 1. Note that in this example scaling in the horizontal (X) direction is applied at a rate of ×16 while scaling in the vertical (Y) direction is applied at a rate of ×1. This results in a scaled character 1008 that is just as tall as the original character 1002 but sixteen times wider.

Referring once again to FIG. 9, once the scaling operation is completed in step 910, operation proceeds to step 912 in which hinting of the scaled image is performed, e.g., by executing the hinting sub-routine 810. The term grid-fitting is sometimes used to describe the hinting process.

Figure 12:
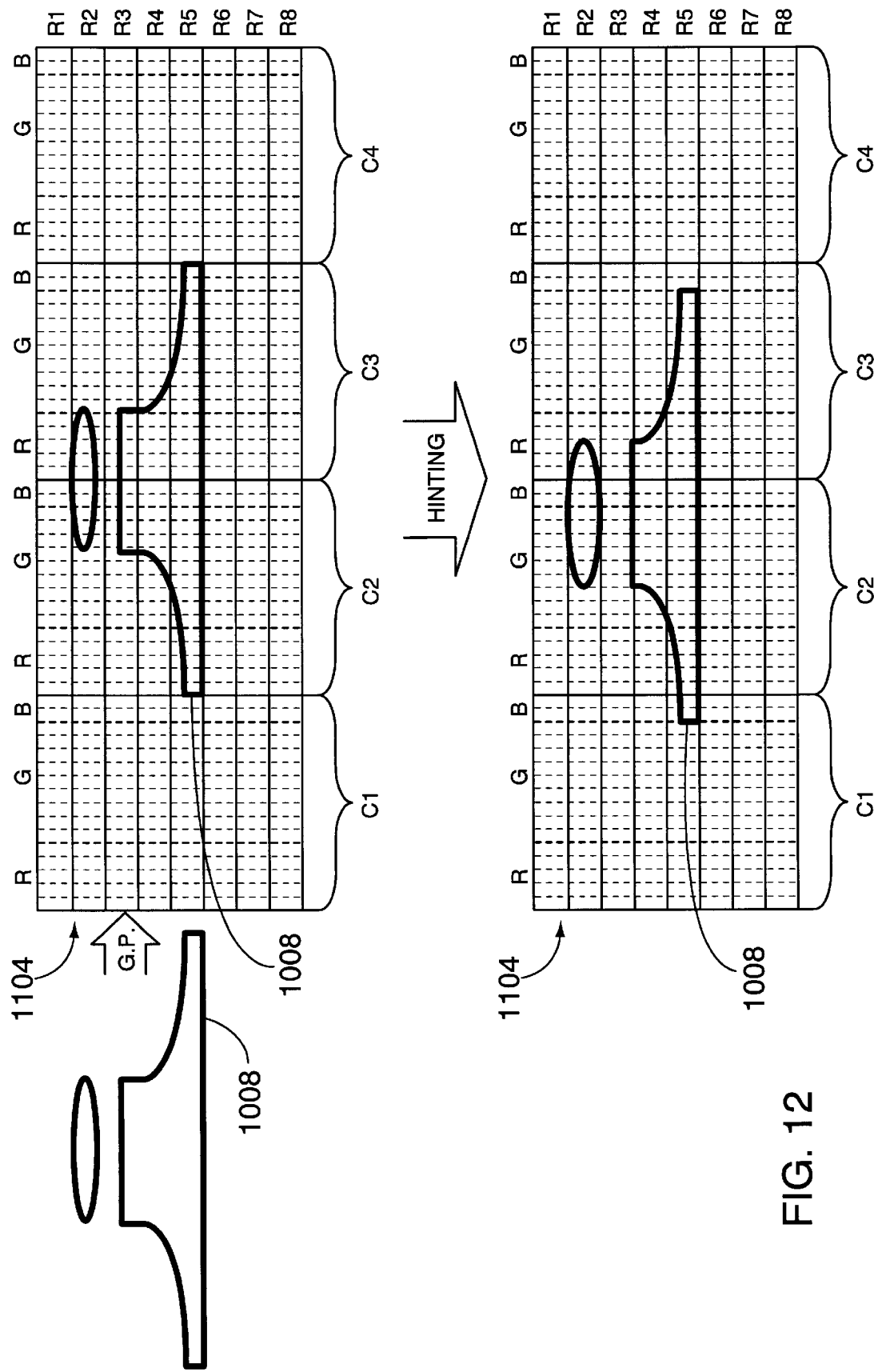
FIG. 12 illustrates an exemplary hinting operation performed in accordance with the present invention.

Hinting operations are illustrated in FIG. 12. FIG. 12 illustrates the hinting of the scaled character 1008 which is intended to be displayed on a monitor with vertical striping.

Hinting involves the alignment of a scaled character, e.g., the character 1008 within a grid 1104 that is used as part of a subsequent scan conversion operation. It also involves the distorting of image outlines so that the image better conforms to the shape of the grid. The grid is determined as a function of the physical size of a display device's pixel elements and any weighting to be applied during the subsequent scan conversion operation.

The present invention treats pixel sub-component boundaries as boundaries along which characters can and should be aligned or boundaries to which the outline of a character should be adjusted.

The hinting process of the present invention involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or sub-pixel component boundary and aligning the bottom of the character's base along a pixel component or sub-component boundary.

Experimental results have shown that in the case of vertical striping, characters with stems aligned so that the character stem has a blue or green left edge generally tend to be more legible than characters with stems aligned to have a red left edge. Accordingly, in at least some embodiments, during hinting of characters to be displayed on a screen with vertical striping, blue or green left edges for stems are favored over red left edges as part of the hinting process.

In the case of horizontal striping, characters aligned so that the bottom of the character base has a red or blue bottom edge generally tend to be more legible than characters with bases aligned to have a green bottom edge. Accordingly, during hinting of characters to be displayed on a screen with horizontal striping, in at least some embodiments, red or blue bottom edges are favored over green bottom edges as part of the hinting process.

FIG. 12 illustrates the application of a hinting operation to the scaled image 1108. As part of the hinting process, the scaled image 1108 is placed on a grid 1104 and its position and outline are adjusted to better conform to the grid shape and to achieve a desired degree of character spacing. The letters "G.P." in FIG. 12 indicates the grid placement step while the term hinting is used to indicate the outline adjustment and character spacing portions of the hinting process.

Once the hinting process is completed in step 912, operation proceeds to step 914 wherein a scan conversion operation is performed in accordance with the present invention, e.g., by executing the scan conversion sub-routine 812 which will be discussed below. In several embodiments, the scan conversion operation is a weighted scan conversion operation as will be discussed below.

Figure 3:
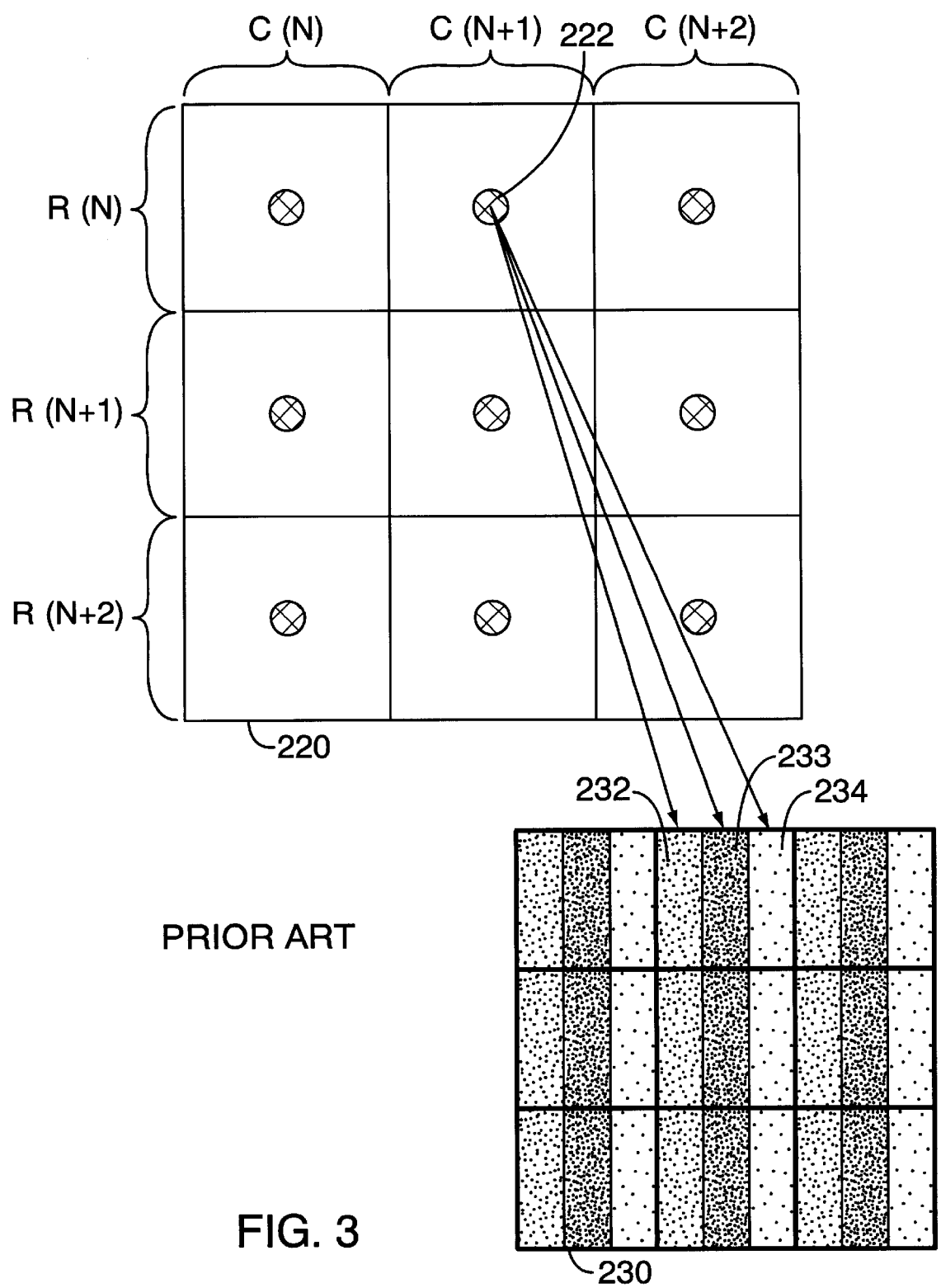
FIG. 3 illustrates an image sampling operation performed in known systems.

Scan conversion involves the conversion of the scaled geometry representing a character into a bitmap image. Conventional scan conversion operations treat pixels as individual units into which a corresponding portion of the scaled image can be mapped. Accordingly, in the case of conventional scan conversion operations, the same portion of an image is used to determine the luminous intensity values to be used with each of the RGB pixel sub-components of a pixel element into which a portion of the scaled image is mapped. FIG. 3 is exemplary of a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a different portion of the scaled image can be mapped. Thus, the present invention allows different portions of a scaled image to be mapped into different pixel sub-components providing for a higher degree of resolution than is possible with the known scan conversion techniques. That is, in various embodiments, different portions of the scaled image are used to independently determine the luminous intensity values to be used with each pixel sub-component.

Figure 6:
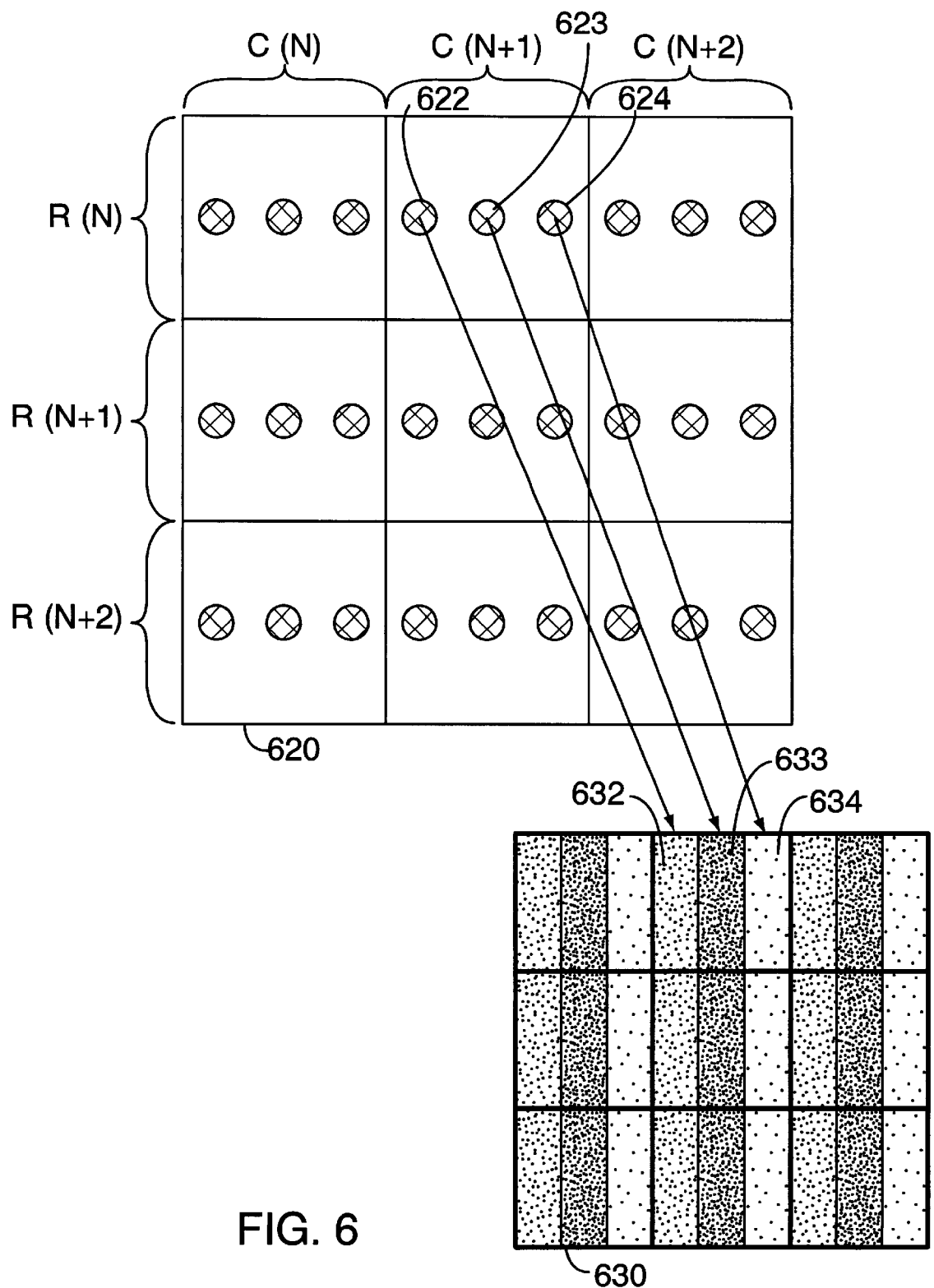
FIG. 6 illustrates image sampling performed in accordance with one exemplary embodiment of the present invention.

FIG. 6 illustrates an exemplary scan conversion operation implemented in accordance with one embodiment of the present invention. In the illustrated embodiment, different image samples 622, 623, 624 of the image represented by the grid 620 are used to generate the red, green and blue intensity values associated with corresponding portions 632, 633, 634 of the bitmap image 630 being generated. In the FIG. 6 example, image samples for red and blue are displaced $-\frac{1}{3}$ and $+\frac{1}{3}$ of a pixel width in distance from the green sample, respectively. Thus, the displacement problem encountered with the known sampling/image representation method illustrated in FIG. 3 is avoided.

As part of the scan conversion operation red, green and blue (R, G, B) luminance intensity values are generated for each pixel sub-component. These may be expressed in the form of separate, red, green and blue luminance intensity levels. In an unweighted scan conversion operation, the R, G, B intensity levels will usually be 0 or 1. In a weighted scan conversion operation more than two intensity levels are normally supported for one or more of the R, G and B pixel sub-components.

In many systems, R, G and B luminance intensity values are specified, stored and processed as three discrete quantities, having a number of bits corresponding to the number used to specify pixel sub-component luminance intensity values to the display adapter 548 and/or display device 547. For example, many systems use 8 bit quantities to represent separate, R, G, and B luminance intensity values. As a result of such an implementation, the processing of R, G, B luminous intensity values requires the storage, processing and transfer of 24 bits per pixel.

In the case of devices, e.g., portable computers and hand held computing devices, where memory, processing, and even bus bandwidth are limited resources, the use of 8 bits to represent each R, G, B luminance intensity value throughout the entire rendering process can present a significant burden on the available resources.

In accordance with one feature of the present invention, in order to reduce the resources, including memory, required to process and store glyphs, separate R, G, and B luminous intensity level values are converted, e.g., compressed, into a single number. This number is referred to herein as a packed pixel value because it represents the packing of the R, G, and B luminous intensity values associated, with a pixel, into a single value. The range of numbers, e.g., range of packed pixel values, used to represent pixel R, G, B luminous intensity levels, is selected to be large enough so that each possible R, G, B luminous intensity level combination can be uniquely identified.

Thus, the total number of packed pixel values, used to represent R, G, B luminous intensity level combinations, should be at least as large as the total number of supported red intensity levels times the total number of supported green intensity levels times the total number of supported blue intensity levels.

Because it is often convenient to work with bytes, i.e., 8 bit quantities, in terms of memory access, processing, and data transfer operations, it is desirable that the total number of supported R, G, B intensity level combinations be capable of being specified as an 8 bit quantity or a multiple thereof. In hand held computing devices a single 8 bit per pixel representation of the three R, G, B luminance intensity values is particularly desirable. This is because of the significant savings in terms of memory, etc. as compared to embodiments which use 8 bits per pixel sub-component luminous intensity value requiring a total of 24 bits per pixel.

In order to limit the resource burden associated with rendering images generally, and text images in particular, one feature of the present invention is directed to converting separate R, G, and B luminous intensity values associated with a pixel into a packed pixel value. In such an embodiment, glyphs are represented, and stored using packed pixel values as opposed to, e.g., three separate 8 bit R, G, and B luminous intensity values. Processing may be performed on the packed pixel value representations with the packed pixel values being transformed or converted into separate R, G, and B luminance values of the form used by the display device 547, prior to the luminous intensity values being supplied to the display adapter 548. The process of converting separate R, G, and B luminous intensity levels into packed pixel values may be performed, in accordance with the present invention, as part of the scan conversion operation.

A simple look-up table, such as the table 1500 illustrated in FIG. 15 can, and in one embodiment is, used to convert between separate R, G, B luminance intensity levels associated with a pixel and a packed pixel value.

As illustrated, the table 1500 includes a total of N (0 through N–1) packed pixel value entries 1502, 1504, 1506, where N is the total number of possible R, G, and B luminous intensity level combinations that may be assigned to a pixel element. Associated with each packed pixel value entry 1502, 1504, 1506 is a corresponding R, G, and B luminous intensity level combination 1501, 1503, 1505, respectively. The R luminous intensity values vary from 0 to RP–1 where RP is the maximum possible number of luminous intensity levels. The G luminous intensity values vary from 0 to GP–1 where GP is the maximum possible number of green luminous intensity levels. The B luminous intensity values vary from 0 to BP–1 where BP is the maximum possible number of blue luminous intensity levels.

Conversion between R, G and B luminous intensity level combinations and packed pixel values can be performed by using the R, G, and B luminous intensity levels associated with a pixel element as an index into look-up table 1500. For example, using the R, G, and B luminous intensity values 1, 0, 0, entry 1501, as an index into table 1500 results in the associated packed pixel value entry 1502 having the value 1 being output. In a similar manner, packed pixel values may be converted into R, G, B luminous intensity values using table 1500 by using the packed pixel value as an index into the table 1500 and outputting the R, G, and B luminous intensity level entry associated with the packed pixel value.

Instead of using the table 1500, it is possible to express the relationship between R, G, B luminous intensity level values and packed pixel values in terms of a mathematical function and use the function to convert between packed pixel values and R, G, B luminous intensity level values. In one embodiment, such a function is implemented in software which is then executed to convert between R, G, B luminous intensity level values and packed pixel values.

In one exemplary embodiment, e.g., where over sampling in the direction perpendicular to the RGB striping by a factor of 16 is supported, six red luminous intensity levels are used, e.g., levels 0–5, 10 green luminous intensity levels are used, e.g., levels 0–9, and three blue luminous intensity levels are used, e.g., levels 0–2. This results in a total of (6×10×3) 180 possible R, G, and B luminous intensity level combinations. In such an embodiment N would equal 180 and the look-up table 1500 would include packed pixel values 0–179. A suitable equation for converting between R, G, B luminous intensity levels and packed pixel values for such an embodiment is:

$$\text{packed pixel value} = (R \times 30) + (G \times 3) + B$$

where R, G, and B are pixel sub-component intensity level values.

Note that the number of supported R, G, and B luminous intensity levels is usually a function of the number of segments used to determine the R, G, and B luminous intensity levels during the scan conversion operation. Note also that in the exemplary embodiment where 180 possibly R, G, B luminance intensity level combinations are supported, each of the packed pixel values 0–179 can be represented using an 8 bit quantity. This represents a significant savings in terms of storage requirements as compared to embodiments where separate 8 bit values arc used, for a total of 24 bits per R, G, B combination.

Figure 10:
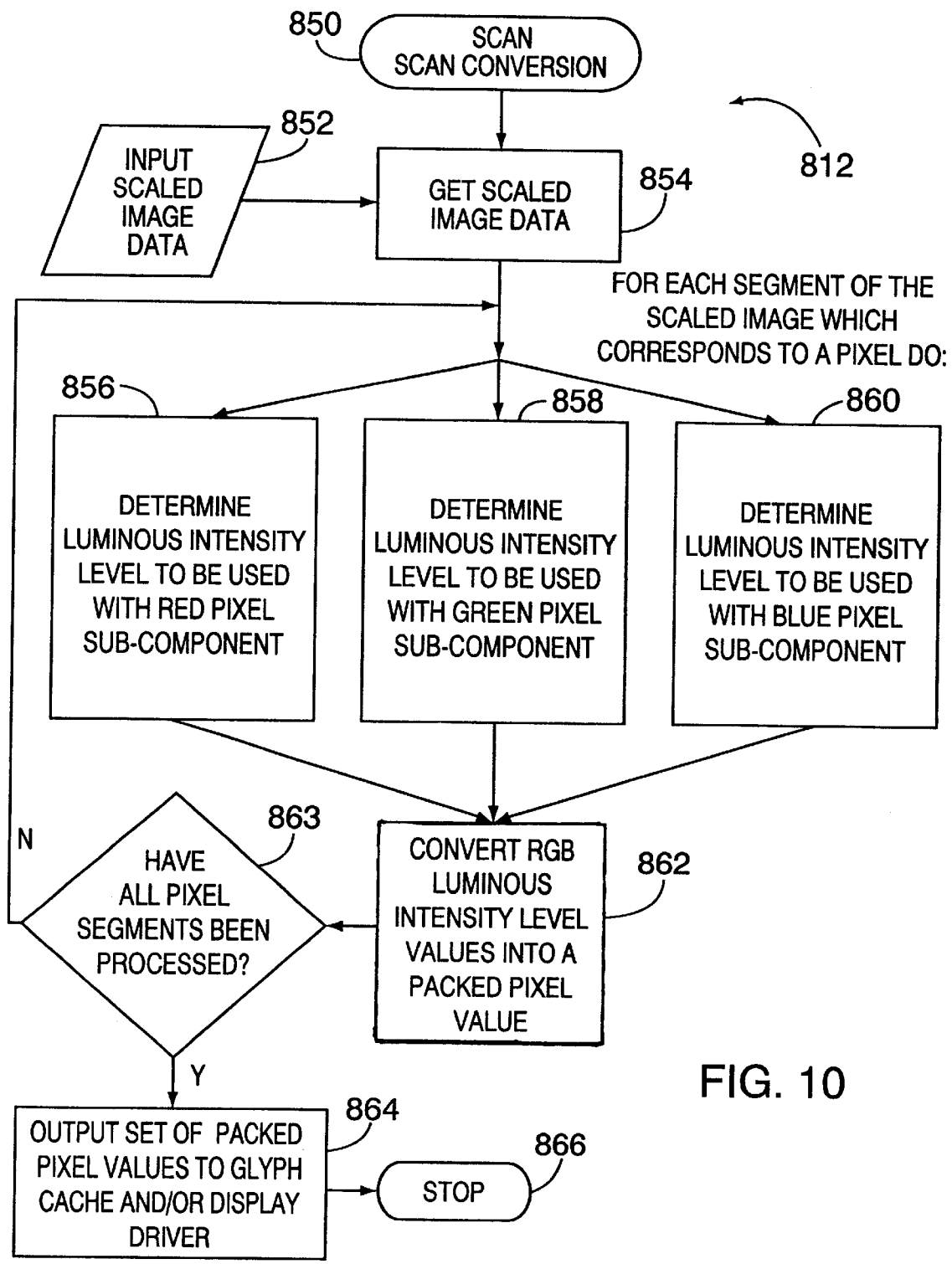
FIG. 10 illustrates a scan conversion routine of the present invention.

FIG. 10 illustrates an exemplary scan conversion routine 812 implemented in accordance with the present invention. The routine 812 starts in step 850 when it is loaded and executed, e.g., by CPU 521. Operation proceeds from step 850 to step 854 wherein the routine 812 receives scaled image data 852 upon which the scan conversion operation is to be performed. The scaled image data normally includes image data relating to multiple pixels. The scaled image data corresponding to each pixel is processed separately by luminance level determination steps 856, 858 and 860. While these steps 856, 858 and 860 are shown as being performed in parallel, they may be performed sequentially.

In step 856, the luminous intensity level to be used with the red pixel sub-component, corresponding to the pixel segment being processed, is determined. This is done, e.g., by determining the number of red pixel sub-component segments which are to be turned "on" by examining the scaled image.

In step 858, the luminous intensity level to be used with the green pixel sub-component, corresponding to the pixel segment being processed, is determined. This is done, e.g., by determining the number of green pixel sub-component segments which are to be turned "on" by examining the scaled image.

In step 860, the luminous intensity level to be used with the blue pixel sub-component, corresponding to the pixel segment being processed, is determined. This is done, e.g., by determining the number of blue pixel sub-component segments which are to be turned "on" by examining the scaled image.

Steps 856, 858, 860 produce a set of R, G, and B luminous intensity level values for the R, G, B pixel sub-components of the pixel element corresponding to the pixel segment being processed.

Once the R, G, B luminous intensity level values for a pixel element are determined operation proceeds to step 862. In step 862, the set of R, G, B luminous intensity values are converted into a packed pixel value, e.g., using a look-up table such as the table 1500 or a function to convert between a set of R, G, B values and a packed pixel value.

In step 863 a determination is made as to whether or not all the pixel segments of the scaled image have been processed. If data corresponding to scaled image segments remains to be processed, operation processed once again to steps 856, 858, 860 so that the scaled image data corresponding to the next pixel segment can be processed.

If in step 863, it is determined that all of the pixel segments of the scaled image have been processed, operation proceeds to step 864. In step 864 the set of generated packed pixel values represent a glyph is output to the glyph cache 809 and/or display driver 830. After output of the packed pixel values in step 864, the scan conversion sub-routine 812 is stopped in step 866 pending re-execution of the sub-routine 812.

Figure 13:
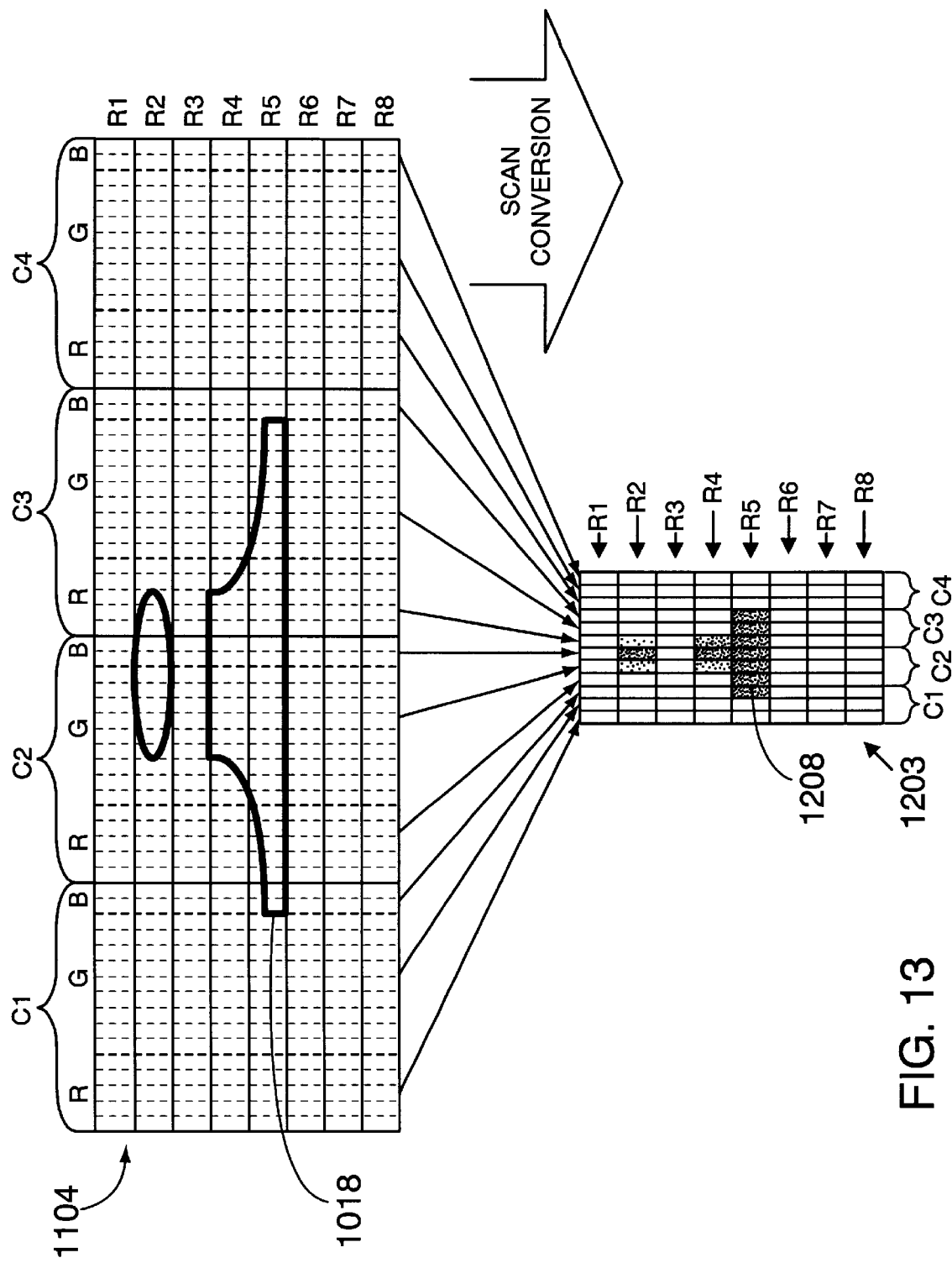
FIG. 13 illustrates a scan conversion operation performed in accordance with an exemplary embodiment of the present invention.

FIG. 13 illustrates a weighted scan conversion operation performed on the hinted image 1018 for display on a display device with vertical striping. There are many different known ways of determining if an image segment is "on" or "off".

In the example illustrated in FIG. 13, white is used to indicate pixel sub-components which are "turned off" in the bitmap image generated by the scan conversion operation. Pixel sub-components which are turned "on", are indicated using stippling. The denser the stippling, the lower the luminous intensity of the stippled pixel sub-component.

In the case of black text "on" implies that the intensity value associated with the pixel sub-component is controlled so that the pixel sub-component does not output light, or outputs light at the minimum possible luminous intensity. Assuming a white background pixel, sub-components which are not "on" would be assigned intensity values which would cause them to output their full light output. Gradations between full "on" and full "off" are possible when the image is placed on a grid having multiple segments per pixel sub-component. In such a case, a count of the number of segments which should be "on" for a given sub-component is determined. The number of image segments which are "on" is a luminous intensity level value. Such a value indicates the luminous intensity to be used for the corresponding pixel sub-component. Use of M segments to represent a pixel sub-component supports M+1 luminous intensity levels, i.e., levels corresponding from 0 "on" segments to M "on" segments.

A first technique for determining if a segment of an image corresponding to a pixel sub-component should be considered as "on" during scaling is to determine if the scaled image segment, represented by a portion of the scaling grid, being mapped into the pixel sub-component is within the scaled representation of the image to be displayed. Another technique is to determine if 50% or more of the scaled image segment being mapped into the pixel sub-component is occupied by the image to be displayed. If it is, then the image segment is considered to be turned "on".

When weighting is applied, different size regions of the scaled image are used to determine whether a particular pixel sub-component should be turned "on", "off" or to a value in between.

In the exemplary embodiment illustrated in FIG. 13, as the result of horizontal over sampling, 16 image segments correspond to each pixel element. Thus, in FIG. 13 a pixel segment comprises 16 image segments. Of the 16 image segments associated with a pixel element, 5 are allocated as corresponding to the red pixel sub-component. These are referred to herein as red image segments. Nine of the 16 pixel segments are allocated to the green pixel sub-component. These are referred to herein as green image segments. The remaining 2, out of the 16 image segments, are allocated to the blue pixel sub-component. These are referred to herein as blue image segments. This allocation of segments supports 6 red, 10 green and 3 blue pixel sub-component intensity levels.

In the exemplary embodiment illustrated in FIG. 13, as the result of horizontal over sampling, 16 image segments correspond to each pixel element. Thus, in FIG. 13 a pixel segment comprises 16 image segments. Of the 16 image segments associated with a pixel element, 5 are allocated as corresponding to the red pixel sub-component. These are referred to herein as red image segments. Nine of the 16 pixel segments are allocated to the green pixel sub-component. These are referred to herein as green image segments. The remaining 2, out of the 16 image segments, are allocated to the blue pixel sub-component. These are referred to herein as blue image segments. This allocation of segments supports 6 red, 10 green and 3 blue pixel sub-components intensity levels.

Other image segment allocations are possible and, in some embodiments, the same number, of segments, e.g., 2 or 3 segments, are allocated per pixel sub-component.

In the FIG. 13 scan conversion example, a pixel segment is considered "on" if it is at least 50% within the image's outline. The scan conversion operation illustrated in FIG. 13 results in the bitmap image 1203 which, in accordance with the present invention, is stored as a set of packed pixel values. Note how each pixel sub-component of bitmap image columns C1–C4 is determined from a different set of 16 image segments. Note also how the intensity of individual pixel sub-components varies depending on the number of "on" segments corresponding to the individual red, green and blue pixel sub-components.

Figure 14:
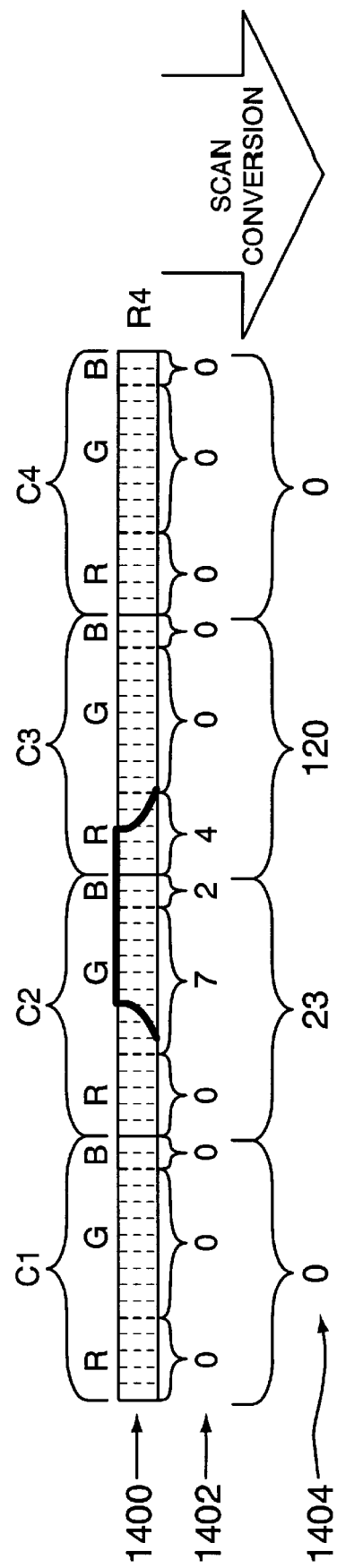
FIG. 14 illustrates the scan conversion operation performed on the fourth row of the image illustrated in FIG. 13 in greater detail.

FIG. 14 illustrates, in greater detail, the result of performing a weighted scan conversion operation on the fourth row 1400 of the scaled hinted image 1018. In FIG. 14, the R, G, B pixel segment counts for each of the R, G, B pixel sub-components is shown in row 1402 directly beneath the corresponding pixel sub-component. The values 1402 are determined in steps 856, 858, 880 of the scan conversion sub-routine 812.

The image of the character being rendered does not pass through the segments corresponding to pixels (C1, R4) and (C4, R4). Accordingly, none of the segments associated with these pixel elements are "on" and all of the R, G, and B sub-pixel segment counts are zero for these two pixels resulting in R, G, and B values of (0,0,0).

With regard to pixel element (C2, R4) the luminance intensity levels obtained by performing scan conversion steps 856, 858, 880 on the scaled image are (0, 7, 2) since there are 0 red pixel sub-component segments within the outline of the image, 7 green pixel sub-component segments that are at least 50% within the outline of the image, and there are 2 blue pixel sub-component segments that are at least 50% within the outline of the image.

With regard to pixel element (C3, R4) the luminance intensity levels obtained by performing a scan conversion operation on the scaled image are (4, 0, 0) since there are 4 red pixel sub-component segments that are at least 50% within the outline of the image, 0 green pixel sub-component segments that are at least 50% within the outline of the image, and 0 blue pixel sub-component segments that are at least 50% within the outline of the image.

The R, G, B luminous intensity pixel sub-component values (0,0,0) (0, 7, 2), (4, 0, 0) and (0, 0, 0) are converted in scan conversion sub-routine step 862 into packed pixel values 0, 23, 120, 0, respectively, in accordance with the present invention.

This may be done by using a look-up table to perform the conversion operation. However, it can also be done by using an equation which relates a set of R, G, and B pixel sub-component luminous intensity level values to a packed pixel value. In one embodiment where 180 possible combinations of R, G, B pixel sub-component luminous intensity level values exist due to supporting 6 red, 10 green, and 3 blue luminous intensity levels, each set of R, G, B luminous intensity level values are converted into a single packed pixel value using the equation:

$$\text{packed pixel value} = (R \times 30) + (G \times 3) + B$$

where R, G, and B are pixel sub-component intensity level values.

Row 1404 illustrates the packed pixel values generated for each pixel element (C1, R4) (C2, R4) (C3, R4) (C4, R4).

The glyphs generated by the scan conversion sub-routine 812 are cached and output to the display driver 830 for display as required. The display driver processes the glyphs. During processing the packed pixel values included in the glyphs are used to generate processed pixel values having a format that is used by the display adapter 548 and/or display device 547. Processed pixel values generated by the display driver are loaded into the screen frame buffer 834 where they are stored and combined with other characters or images to form a composite image, e.g., a text string, which is displayed on the display 547. When the display needs to be updated, the screen frame buffer 834 outputs the processed pixel values stored therein to the display adapter 548. The display adapter uses these values to generate an image on the display 547.

The display driver 830 performs a plurality of processing operations including gamma correction, color compensation (color filtering) and/or palette selection when generating the processed pixel values which are output to the screen frame buffer 834. The operations performed by the display driver 830 may be implemented as a series of sequential image processing operations as represented by block 833 which lists various performed operations.

In order to expedite the implementation of device driver processing, one particular embodiment of the present invention includes a set 831 of look-up tables 832, 832', 832". The look-up tables include an array of entries each entry including one or more pre-computed pixel values that result from performing a set of display driver processing operations, e.g., gamma correction, color compensation and/or palette selection on a set of packed pixel values. As discussed above, since the pixel values in the look-up tables 832, 832', 832" are the result of several processing operations, they are often called processed pixel values. A different set of processed pixel values is included for each set of processing operations that may be performed by the display driver 830. For example, a different look-up table will be included for each color palette which may be selected. Thus, one look-up table may be used for applications which use the Internet and a selected Internet color palette while another table will be used for text application that rely on another color palette. Different look-up tables are also included for different processed pixel value formats that are supported. For example, one look-up table may output processed pixel values which use 8 bits to specify each of the red, green, and blue pixel sub-component luminous intensity values for a total of 24 bits per set of processed pixel values while another format might use only 16 bits per set of processed pixel values.

Different look-up tables are also provided for different gamma values that are used, e.g., for different display devices.

In FIG. 8, the arrow leading from display information block 815 into the block 831 which represents the set of look-up tables, indicates the use of display information such as gamma values, color palette information, foreground/background color information and pixel value format information in selecting which one of the look-up tables 832, 832', 832" should be used at any given time to convert received packed pixel values to processed pixel values.

FIG. 17 illustrates an exemplary look-up table 832. As illustrated, the table 832 comprises an array 835 of N entries, each of which includes a set of R, G, B luminous intensity values 1701, 1703, 1705, also referred to herein as processed pixel values. Column 833, located to the right of column 835, shows the array position of each table entry 1701, 1703, 1705. Note that each possible packed pixel value can be interpreted as specifying a different array position. In this manner, for each possible packed pixel value 1502, 1504, 1506, the table 832 includes one corresponding entry, i.e., a set of processed pixel values 1701, 1703, 1705. In the FIG. 17 illustration, N is used to represent the total number of possible packed pixel values that may be received by the device driver 830. PR, PG, PB are used to represent processed red, processed green and processed blue pixel sub-component luminous intensity values. The subscripts indicate the set of processed pixel values to which the individual processed pixel values correspond.

Figure 20:
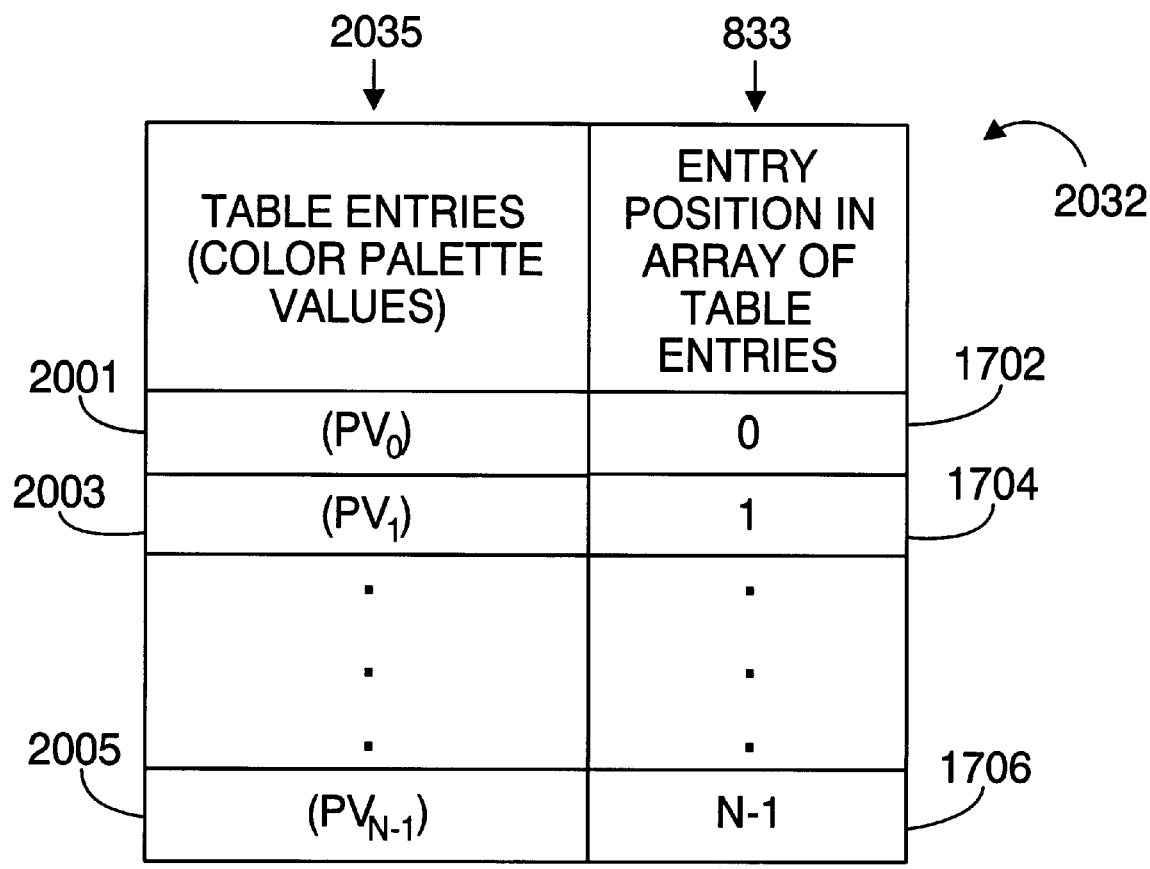
FIG. 20 illustrates another exemplary device driver pixel value look-up table.

FIG. 20 illustrates another display driver look-up table 2032 implemented in accordance with the present invention. As illustrated, the table 2032 comprises an array 2035 of N entries, each of which includes a color palette value PV. Column 833, which is located to the right of column 2035, shows the position of each table entry 2701, 2703, 2705 in the array of entries which comprise the table 2032. Note that each possible packed pixel value can be interpreted as specifying a different array position. In this manner, for each possible packed pixel value, the table 2032 includes one corresponding entry, i.e., one of the color palette values $PV_0$ through $PV_{N-1}$. In the FIG. 20 illustration, N is used to represent the total number of possible packed pixel values that may be received by the device driver 830. corresponding entry, i.e., one of the color palette value $PV_0$ through $PV_{N-1}$. In the FIG. 20 illustration, N is used to represent the total number of possible packed pixel values that may be received by the device driver 830.

By using the packed pixel value as an index into the table 832 or 2032, and outputting the corresponding one of the table entries 1701, 1703, 1705, 2001, 2003, or 2005 display device processing including gamma correction, color filtering and/or palette selection operations can be implemented quickly as a simple look-up table operation while avoiding the need to use a large amount of processing resources.

Figure 16:
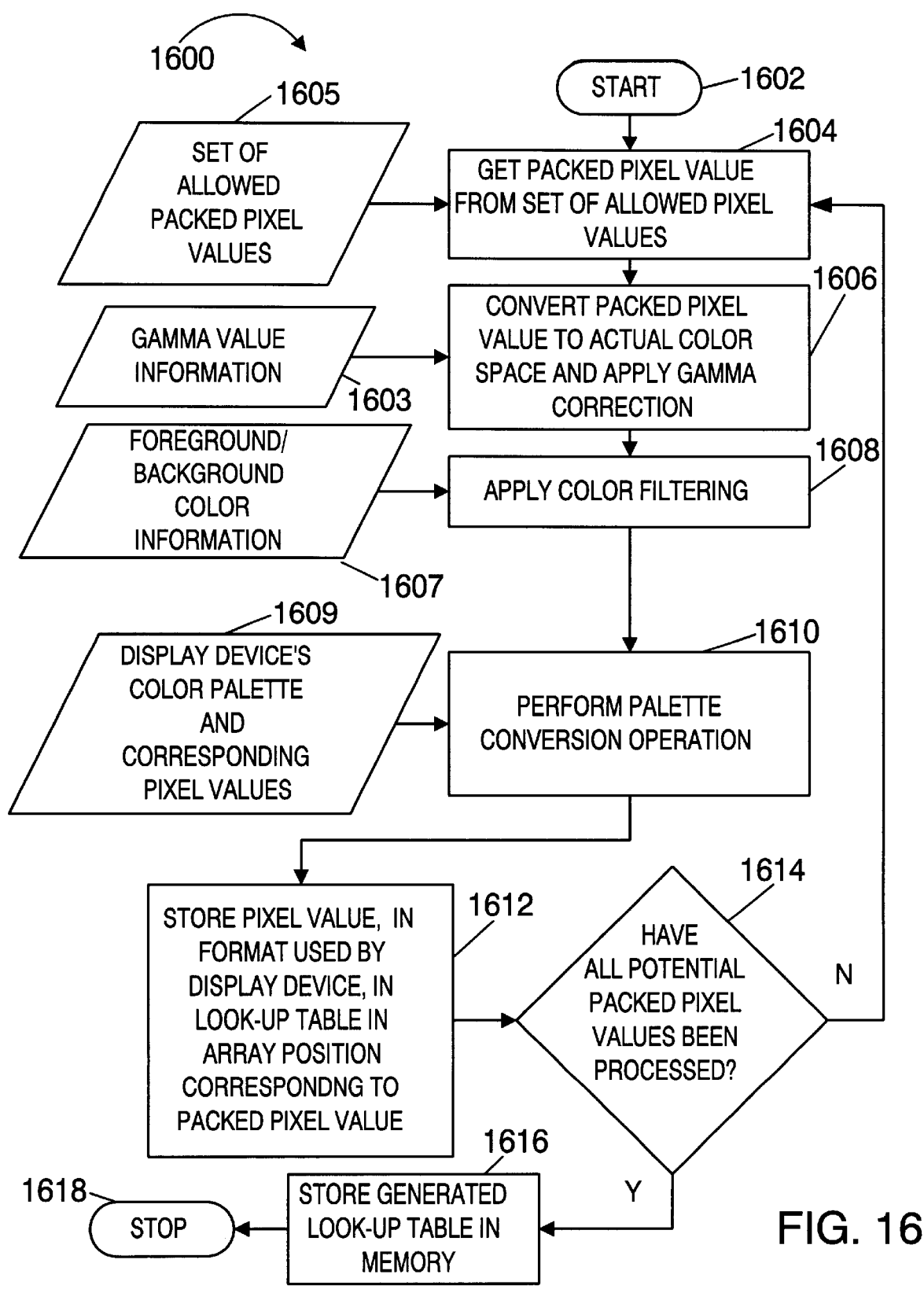
FIG. 16 illustrates a method for generating a device driver pixel value look-up table.

FIG. 16 illustrates a display device look-up table generation routine 1600 which may be used to generate the display device look-up tables 832, 832', 832". The routine 1600 is used, in various embodiments, prior to use of the display driver 830. The routine 1600 can be executed on the machine 520 which is used to perform image rendering. Alternatively it can be executed on a different machine 520 and then loaded into memory 522 or the hard disk drive 527 of the machine which is to use the table, e.g., when the operating system is installed.

The generation of a display device look-up table 1700 begins in step 1602 with execution of the routine 1600. Operation proceeds from START step 1602 to step 1604 wherein a packed pixel value is obtained from the set of allowed packed pixel values 1605. In the above discussed example, the set of packed pixel values would include 180 values. Once a packed pixel value is obtained, it is converted in step 1606 to the actual color space used by the display device and gamma correction is applied. Conversion of the packed pixel value to the actual color space involves converting the packed pixel value being processed, into its corresponding R, G, B luminous intensity level values, e.g., using look-up table 1500 and then converting the R, G, B level values into corresponding values in the actual color space, e.g., a 256 level color space.

Gamma correction is applied as a function of supplied gamma value information 1603 which may be provided as a set of limits, e.g., maximum and minimum luminous intensity values which may be used. Different gamma values may be specified for different display devices. The output of step 1606, is a set of gamma corrected red, green and blue luminous intensity values in the actual color space of the utilized display device, e.g., R, G and B luminous intensity values ranging in value from 0 to 255 may be specified.

In step 1608, color filtering is applied to the set of R, G, B luminous intensity values output by step 1606. The applied color filtering is designed to reduce or eliminate otherwise distracting color distortions that can result from treating pixel sub-components as independent luminous intensity sources. The color filtering may also be used to apply foreground and background color selections to the images being produced when the foreground/background colors are to be other than black and white. Accordingly, foreground/background color information 1607 is utilized during the color filtering operation 1608.

Filtered R, G, B luminous intensity values produced by the color filtering step 1608 are processed further in step 1610. In step 1610, the color represented by the filtered R, G, B luminous intensity values is compared to a palette of colors supported by the display device 547. In step 1610, a color palette value corresponding to the pallet color which is closest to the pixel color produced by the R, G, B luminous intensity values output by the filtering step 1608, is selected for use. The palette value, in the format used by the display adapter 548 and/or display device 547, represents a processed pixel value. In step 1612, the generated processed pixel value is stored in the display device look-up table being generated in an array position entry corresponding to the packed pixel value which was used to produce the pixel value being stored.

After storing the generated packed pixel value, e.g., color palette value, operation proceeds to step 1614. In step 1614 a determination is made as to whether or not all the packed pixel values in the set 1605 of packed pixel values have been processed. If unprocessed packed pixel values remain, operation proceeds from step 1614 to step 1604 wherein processing of the next packed pixel value begins.

If, however, in step 1614 it is determined that all the packed pixel values in the set 1605 of packed pixel values have been processed operation proceeds to step 1616 wherein the generated display driver look-up table is stored in memory 522 and/or on the hard disk drive 527.

With the storage of the generated display driver look-up table stored in memory, operation the look-up table generation routine 1600 stops in step 1618 until being re-executed to generate a new look-up table.

Figure 18:
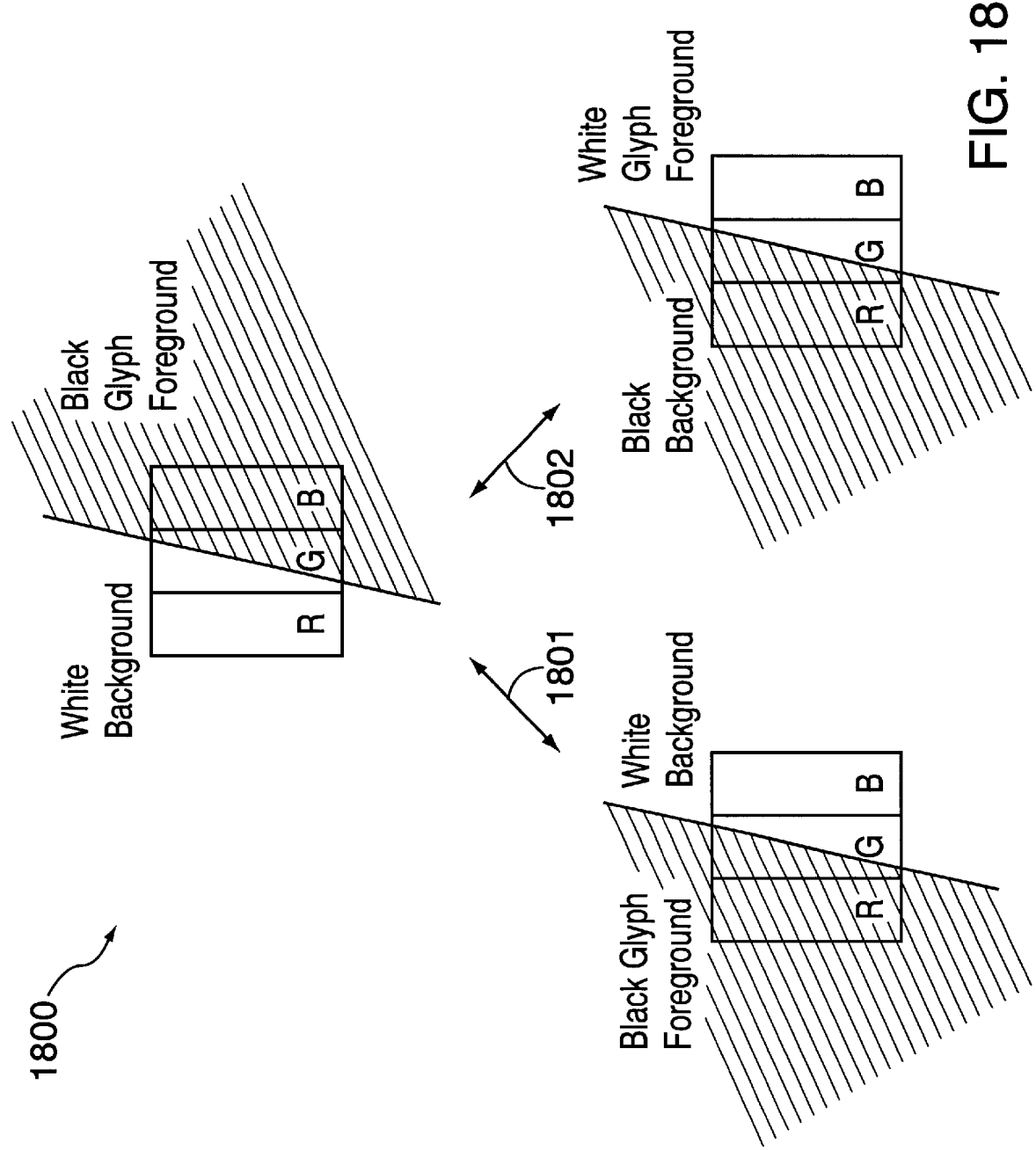
FIG. 18 illustrates switching between a light foreground/dark background image representation and a dark foreground/light background image representation.

The look-up tables 832, 832', 832" are each generated for a specific foreground and background color combination. In many cases, it may be desirable to switch between foreground and background colors, as illustrated in FIG. 18 to make a certain portion of displayed text stand out. In FIG. 18, the first and second arrows 1801, 1802 represent switching between foreground and background colors.

In accordance with the present invention, which color is used as the foreground and background color can be altered by simply changing the way in which the look-up table 832, 832' or 832" is accessed. The set of look-up tables 83 1 are normally stored for use with a dark foreground and light background since this is the display format usually preferred for text display.

By subtracting a packed pixel value P from the largest number packed pixel value a transformed packed pixel value P' is obtained.

That is:

$$P'=Pmax-P$$

In the exemplary case where packed pixel values can range from 0 through 179 in value, Pmax=179 and $$P'=179-P.$$

Using the transformed packed pixel values to access the look-up table 832, 832' or 832" results in a set of processed pixel values corresponding to a light foreground and dark background.

Accordingly, the present invention allows for a single display driver look-up table 832 to be stored for each pair of foreground and background colors which are supported. The stored table is arranged assuming that a first one of the pair of colors will be used as the foreground color and a second one of the colors will be used as the background color. When using packed pixel values corresponding to the specified foreground and background colors, a set of processed pixel values is obtained by using the packed pixel value as an index into the look-up table.

When it is desired to use a foreground/background color combination that is opposite of that for which the look-up table was created, a transformed packed pixel value is created by first subtracting the packed pixel value from the highest supported pixel value number and then using the transformed packed pixel value to access the look-up table 832.

To avoid the need to perform pixel value transform operations to reverse foreground/background colors, one embodiment of the present invention utilizes a look-up table 1900 with two packed pixel values corresponding to each set of processed pixel values. The first set of packed pixel values 833 corresponds to a dark foreground/light background selection while the second set of packed pixel values 1902 corresponds to a light foreground/dark background. Depending on the foreground/background selection desired for a given pair of colors, either the first or second set of packed pixel values 833, 1902 is used as the index into look-up table 1900.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. In a computer system that includes a display device having pixels each including a plurality of separately controllable pixel sub-components of different colors, a method of displaying an image on the display device using a look-up table that converts packed pixel values to sets of pixel sub-component values for controlling the pixel sub-components of the display device, the method comprising the acts of:

storing a look-up table that includes an array of entries, each entry including a set of pixel sub-component values and a corresponding packed pixel value;

receiving, as part of an image rendering process, a packed pixel value, wherein the packed pixel value has been generated in a compression operation based on image data that is to be displayed on the display device;

using the received packed pixel value as an index to the look-up table and obtaining, from an entry of the look-up table that includes the received packed pixel value, a first set of pixel sub-component values, the first set of pixel sub-component values corresponding to the received packed pixel value; and using each of the pixel sub-component values of the first set of pixel sub-component values to control the pixel sub-components of a first pixel of the display device so as to display the image on the display device, each of the pixel sub-components of the first pixel being separately controlled by a different one of the pixel sub-component values of the first set of pixel sub-component values such that each pixel sub-component of the first pixel represents a different portion of the image.

2. A method as defined in claim 1, wherein the packed pixel value and the first set of pixel sub-component values each comprise data bit values, and wherein the packed pixel value comprises fewer bits than the first set of pixel sub-component values.

3. A method as defined in claim 1, further comprising the acts of:

processing the received packed pixel value to generate a transformed packed pixel value; and using the transformed packed pixel value as an index to the look-up table to obtain, from an entry of the look-up table that includes the transformed packed pixel value, a second set of pixel sub-component values, the second set of pixel sub-component values corresponding to the transformed packed pixel value.

4. A method as defined in claim 3, further comprising the acts of:

using the first set of pixel sub-component values to control foreground color of the image; and using the second set of pixel sub-component values to control background color of the image.

5. A method as defined in claim 3, further comprising the acts of:

using the first set of pixel sub-component values to control background color of the image; and using the second set of pixel sub-component values to control foreground color of the image.

6. A method as defined in claim 1, wherein each of the pixel sub-component values stored in the table comprises a processed pixel sub-component value, and wherein a processing operation is used to generate each of the processed pixel sub-component values.

7. A method as defined in claim 6, wherein the processing operation comprises gamma correction.

8. A method as defined in claim 6, wherein the processing operation comprises color compensation.

9. A method as defined in claim 6, wherein the processing operation comprises color palette selection.

10. A method as defined in claim 1, wherein each set of sub-component values stored in the table comprises a red, blue, and green pixel luminous intensity value.

11. A method of generating a look-up table that is capable of converting packed pixel values to sets of pixel sub-component values so that the sets of pixel sub-component values can be used to display an image on a display device having pixels each including a plurality of separately controllable pixel sub-components of different colors, the method comprising the acts of:

selecting a plurality of packed pixel values that are to be indices to a look-up table;

generating, for each of the plurality of packed pixel values, a set of corresponding pixel sub-component values;

generating the look-up table by storing each of the sets of pixel sub-component values in an array entry of the look-up table in a memory device at an array position associated with the corresponding packed pixel value, such that packed pixel values can be used as indices into the array entries of the look-up table to obtain the corresponding pixel sub-component values to be applied to pixel sub-components of the display device; and making the look-up table available to a display system that includes the display device, wherein the display system, upon receiving a packed pixel value, is capable of:

using the received packed pixel value as an index to the look-up table to obtain the corresponding set of pixel sub-components; and using each of the pixel sub-component values of the obtained set of pixel sub-component values to control the pixel sub-components of a pixel of the display device so as to display the image on the display device, each of the controlled pixel sub-components being separately controlled by a different one of the pixel sub-component values such that each pixel sub-component represents a different portion of the image.

12. A method as defined in claim 11, wherein the act of generating the look-up table by storing each of the sets of pixel sub-component values in an array entry includes the act of processing each of the pixel sub-component values with a processing operation.

13. A method as defined in claim 12, wherein the processing operation comprises at least one of gamma correction, color compensation, and palette selection.

14. A method as defined in claim 11, wherein each set of pixel sub-component values and each corresponding packed pixel value comprise data bit values, and wherein each of the corresponding packed pixel values comprise fewer bits than each of the sets of pixel sub-component values.

15. A method as defined in claim 11, wherein each set of pixel sub-component values comprises a first, second, and third sub-component luminous intensity value.

16. A method as defined in claim 15, wherein each set of sub-component values stored in the table comprises a red, blue, and green pixel luminous intensity value.

17. A method as defined in claim 16, wherein the possible number of first, second, and third sub-component luminous intensity values is 256.

18. A method as defined in claim 11, further comprising the act of generating, for each of the plurality of packed pixel values, a transformed packed pixel value, wherein each of the transformed packed pixel values comprises the total quantity of the plurality of packed pixel values minus the corresponding packed pixel value.

19. A method as defined in claim 18, wherein the act of generating the look-up table further comprises the act of storing each of the transformed packed pixel values in an array entry of the look-up table at an array position associated with the corresponding packed pixel value used to generate the transformed packed pixel value, such that transformed packed pixel values can also be used as indices into the array entries of the look-up table to obtain the corresponding pixel sub-component values to be applied to pixel sub-components of the display device.

20. In a computer system that transmits to a display system data for rendering an image, wherein the display system includes a display device having pixels each including a plurality of separately controllable pixel sub-components of different colors, a method for generating the data transmitted to the display system, the method comprising the acts of:

generating, from a scaled representation of an image, a set of pixel sub-component values, each of the pixel sub-component values corresponding to a different pixel sub-component of a pixel of the display device;

converting the plurality of pixel sub-component luminous intensity values to a single packed pixel value, wherein the set of pixel sub-component values comprises a number of bits, and wherein the single packed pixel value comprises fewer bits than the set of pixel sub-component values; and transmitting the single packed pixel value to the display system, wherein the display system has access to a look-up table that correlates packed pixel values to corresponding sets of pixel sub-component values and wherein, the display system, upon receiving the single packed pixel, is capable of:

using the received single packed pixel value as an index to the look-up table to obtain the corresponding set of pixel sub-component values; and using each of the pixel sub-component values of the obtained set of pixel sub-component values to control the pixel sub-components of a pixel of the display device so as to display the image on the display device, each of the controlled pixel sub-components being separately controlled by a different one of the pixel sub-component values such that each pixel sub-component represents a different portion of the image.

21. A method as defined in claim 20, wherein each of the pixel sub-component values stored in the table comprises a processed pixel sub-component value, and wherein a processing operation is used to generate each of the processed pixel sub-component values.

22. A method as defined in claim 21, wherein the processing operation comprises gamma correction.

23. A method as defined in claim 21, wherein the processing operation comprises color compensation.

24. A method as defined in claim 21, wherein the processing operation comprises color palette selection.

25. A method as defined in claim 21, wherein each set of sub-component values stored in the table comprises a red, blue, and green pixel luminous intensity value.

* * * * *

UNITED STATES PATENT AND TRADEMARK OFFICE
CERTIFICATE OF CORRECTION

PATENT NO.    : 6,342,896 B1  
DATED         : January 29, 2002  
INVENTOR(S)   : Martin T. Shetter, Gregory C. Hitchcock and Bodin Dresevic It is certified that error appears in the above-identified patent and that said Letters Patent is hereby corrected as shown below:

Column 11,  
Line 59, change "look-tip" to -- look-up --

Column 20,  
Line 56, after "driver 830." delete "corresponding entry, i.e. one of the color palette $PV_0$ through $PV_{N-1}$. In the FIG. 20 illustration, N is used to represent the total number of possible packed pixel values that may be received by the device driver 830."

Signed and Sealed this

Twenty-fourth Day of September, 2002

Attest:

*Attesting Officer*

JAMES E. ROGAN  
*Director of the United States Patent and Trademark Office*